United States Patent
Quam et al.

(10) Patent No.: US 10,302,322 B2
(45) Date of Patent: May 28, 2019

(54) TRIAGE OF INITIAL SCHEDULE SETUP FOR AN HVAC CONTROLLER

(71) Applicant: Ademco Inc., Golden Valley, MN (US)

(72) Inventors: David Quam, Golden Valley, MN (US); Sara Slate, Austin, TX (US); Ted Booth, Brooklyn, NY (US); Shannon Roberts, Austin, TX (US); Jason Tiefenauer, Round Rock, TX (US); Dan Tran, Austin, TX (US)

(73) Assignee: Ademco Inc., Golden Valley, MN (US)

( * ) Notice: Subject to any disclaimer, the term of this patent is extended or adjusted under 35 U.S.C. 154(b) by 51 days.

(21) Appl. No.: 15/217,783

(22) Filed: Jul. 22, 2016

(65) Prior Publication Data
US 2018/0023827 A1      Jan. 25, 2018

(51) Int. Cl.
| | |
|---|---|
| *F24F 11/30* | (2018.01) |
| *G05B 19/409* | (2006.01) |
| *G05B 15/02* | (2006.01) |
| *H04L 12/28* | (2006.01) |
| *G06F 3/0484* | (2013.01) |

(Continued)

(52) U.S. Cl.
CPC .............. *F24F 11/30* (2018.01); *F24F 11/52* (2018.01); *F24F 11/56* (2018.01); *G05B 15/02* (2013.01); *G05B 19/409* (2013.01); *G06F 3/0482* (2013.01); *G06F 3/04842* (2013.01); *G06F 3/04847* (2013.01); *H04L 12/282* (2013.01); *F24F 11/61* (2018.01); *F24F 2110/00* (2018.01); *F24F 2120/20* (2018.01); *F24F 2140/10* (2018.01);

(Continued)

(58) Field of Classification Search
CPC ............. F24F 11/001; F24F 2011/0057; F24F 2011/0073; G05B 15/02; G05B 19/409; G05B 2219/2614; G06F 3/0482; G06F 3/04842; G06F 3/04847; H04L 12/282
See application file for complete search history.

(56) References Cited

U.S. PATENT DOCUMENTS

| | | |
|---|---|---|
| 3,656,112 A | 4/1972 | Paull |
| 3,900,842 A | 8/1975 | Calabro et al. |

(Continued)

FOREIGN PATENT DOCUMENTS

| | | |
|---|---|---|
| CN | 101689327 | 5/2013 |
| DE | 3334117 | 4/1985 |

(Continued)

OTHER PUBLICATIONS

Lloyd, Crag, "How to Make Your Nest Automatically Detect When You're Away", howtogeek.com, May 3, 2016 (accessed on Jan. 10, 2018 from <<https://www.howtogeek.com/244681/how-to-make-your-nestautomatically-detect-when-youre-away/>>).*

(Continued)

*Primary Examiner* — Kenneth M Lo
*Assistant Examiner* — Michael J Huntley
(74) *Attorney, Agent, or Firm* — Shumaker & Sieffert, P.A.

(57) ABSTRACT

An HVAC controller may be configured to control at least part of an HVAC system in accordance with any one of several different scheduling options, such as a location-based scheduling option and time-based scheduling option. In some cases, a user may be guided through several different scheduling options in a methodical, easy to understand sequence of information displays.

16 Claims, 19 Drawing Sheets

(51) Int. Cl.
*G06F 3/0482* (2013.01)
*F24F 11/56* (2018.01)
*F24F 11/52* (2018.01)
*F24F 11/61* (2018.01)
*F24F 120/20* (2018.01)
*F24F 110/00* (2018.01)
*F24F 140/10* (2018.01)

(52) U.S. Cl.
CPC .............. *G05B 2219/25067* (2013.01); *G05B 2219/2614* (2013.01); *G05B 2219/2642* (2013.01)

(56) References Cited

U.S. PATENT DOCUMENTS

| | | |
|---|---|---|
| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A | 11/1981 | Hartsell et al. |
| 4,308,991 A | 1/1982 | Peinetti et al. |
| 4,314,665 A | 2/1982 | Levine |
| 4,332,352 A | 6/1982 | Jaeger |
| 4,337,822 A | 7/1982 | Hyltin et al. |
| 4,337,893 A | 7/1982 | Flanders et al. |
| 4,357,665 A | 11/1982 | Korff |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,399,510 A | 8/1983 | Hicks |
| 4,401,262 A | 8/1983 | Adams et al. |
| 4,429,299 A | 1/1984 | Käbat et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,510,398 A | 4/1985 | Culp et al. |
| 4,511,979 A | 4/1985 | Amirante |
| 4,551,812 A | 11/1985 | Gurr et al. |
| 4,556,169 A | 12/1985 | Zervos |
| 4,556,865 A | 12/1985 | Fukagawa et al. |
| 4,591,988 A | 5/1986 | Klima et al. |
| 4,606,401 A | 8/1986 | Levine et al. |
| 4,608,560 A | 8/1986 | Allgood |
| 4,621,336 A | 11/1986 | Brown |
| 4,622,544 A | 11/1986 | Bially et al. |
| 4,628,201 A | 12/1986 | Schmitt |
| 4,630,670 A | 12/1986 | Wellman et al. |
| 4,642,607 A | 2/1987 | Strom et al. |
| 4,646,964 A | 3/1987 | Parker et al. |
| 4,656,835 A | 4/1987 | Kidder et al. |
| 4,657,179 A | 4/1987 | Aggers et al. |
| 4,717,333 A | 1/1988 | Carignan |
| 4,725,001 A | 2/1988 | Carney et al. |
| 4,742,475 A | 5/1988 | Kaiser et al. |
| 4,771,185 A | 9/1988 | Feron et al. |
| 4,819,714 A | 4/1989 | Otsuka et al. |
| 4,837,731 A | 6/1989 | Levine et al. |
| 4,881,686 A | 11/1989 | Mehta |
| 4,909,041 A | 3/1990 | Jones |
| 4,914,568 A | 4/1990 | Kodosky et al. |
| 4,916,328 A | 4/1990 | Culp, III |
| 4,918,439 A | 4/1990 | Wozniak et al. |
| 4,924,404 A | 5/1990 | Reinke, Jr. |
| 4,948,040 A | 8/1990 | Kobayashi et al. |
| 4,992,779 A | 2/1991 | Sugino et al. |
| 4,997,029 A | 3/1991 | Otsuka et al. |
| 5,003,457 A | 3/1991 | Ikei et al. |
| 5,005,365 A | 4/1991 | Lynch |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,153,837 A | 10/1992 | Shaffer et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,270,952 A | 12/1993 | Adams et al. |
| 5,289,362 A | 2/1994 | Liebel et al. |
| 5,329,991 A | 7/1994 | Mehta et al. |
| 5,348,078 A | 9/1994 | Dushane et al. |
| 5,386,577 A | 1/1995 | Zenda |
| 5,392,042 A | 2/1995 | Pellon |
| 5,395,042 A | 3/1995 | Riley et al. |
| 5,404,934 A | 4/1995 | Carlson et al. |
| 5,482,209 A | 1/1996 | Cochran et al. |
| 5,526,422 A | 6/1996 | Keen |
| 5,537,106 A | 7/1996 | Mitsuhashi |
| 5,544,036 A | 8/1996 | Brown, Jr. et al. |
| 5,566,879 A | 10/1996 | Longtin |
| 5,570,837 A | 11/1996 | Brown et al. |
| 5,644,173 A | 7/1997 | Elliason et al. |
| 5,673,850 A | 10/1997 | Uptegraph |
| 5,682,206 A | 10/1997 | Wehmeyer et al. |
| 5,706,191 A | 1/1998 | Bassett et al. |
| 5,732,691 A | 3/1998 | Maiello et al. |
| 5,761,083 A | 6/1998 | Brown, Jr. et al. |
| 5,782,296 A | 7/1998 | Mehta |
| 5,802,467 A | 9/1998 | Salazar et al. |
| 5,818,428 A | 10/1998 | Eisenbrandt et al. |
| 5,845,259 A | 12/1998 | West et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | Garin et al. |
| 5,902,183 A | 5/1999 | D'Souza |
| 5,915,473 A | 6/1999 | Ganesh et al. |
| 5,937,942 A | 8/1999 | Bias et al. |
| 5,947,372 A | 9/1999 | Tiernan |
| 5,950,709 A | 9/1999 | Krueger et al. |
| 5,982,445 A | 11/1999 | Eyer et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,088,029 A | 7/2000 | Guiberson et al. |
| 6,098,893 A | 8/2000 | Berglund et al. |
| 6,101,824 A | 8/2000 | Meyer et al. |
| 6,104,963 A | 8/2000 | Cebasek et al. |
| 6,119,125 A | 9/2000 | Gloudeman |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,255,988 B1 | 7/2001 | Bischoff |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,320,577 B1 | 11/2001 | Alexander |
| 6,330,806 B1 | 12/2001 | Beaverson et al. |

(56) References Cited

U.S. PATENT DOCUMENTS

| | | |
|---|---|---|
| 6,344,861 B1 | 2/2002 | Naughton et al. |
| 6,351,693 B1 | 2/2002 | Monie et al. |
| 6,356,282 B2 | 3/2002 | Roytman et al. |
| 6,398,118 B1 | 6/2002 | Rosen et al. |
| 6,400,956 B1 | 6/2002 | Richton |
| 6,453,687 B2 | 9/2002 | Sharood et al. |
| 6,462,422 B2 | 10/2002 | Huang |
| 6,466,132 B1 | 10/2002 | Caronna et al. |
| 6,478,233 B1 | 11/2002 | Shah |
| 6,483,906 B1 | 11/2002 | Iggulden et al. |
| 6,502,758 B2 | 1/2003 | Cottrell |
| 6,518,953 B1 | 2/2003 | Armstrong |
| 6,518,957 B1 | 2/2003 | Lehtinen et al. |
| 6,529,137 B1 | 3/2003 | Roe |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,604,023 B1 | 8/2003 | Brown et al. |
| 6,608,560 B2 | 8/2003 | Abrams |
| 6,619,555 B2 | 9/2003 | Rosen |
| 6,621,507 B1 | 9/2003 | Shah |
| 6,665,613 B2 | 12/2003 | Duvall |
| 6,681,848 B2 | 1/2004 | Breeden |
| 6,726,112 B1 | 4/2004 | Ho |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,851,621 B1 | 2/2005 | Wacker et al. |
| 6,868,293 B1 | 3/2005 | Schurr et al. |
| 6,891,838 B1 | 5/2005 | Petite et al. |
| 6,909,891 B2 | 6/2005 | Yamashita et al. |
| 6,967,565 B2 | 11/2005 | Lingemann |
| 6,973,410 B2 | 12/2005 | Seigel |
| 6,975,958 B2 | 12/2005 | Bohrer et al. |
| 6,990,335 B1 | 1/2006 | Shamoon et al. |
| 7,001,495 B2 | 2/2006 | Essalik et al. |
| 7,050,026 B1 | 5/2006 | Rosen |
| 7,083,109 B2 | 8/2006 | Pouchak |
| 7,127,734 B1 | 10/2006 | Amit |
| 7,130,719 B2 | 10/2006 | Ehlers et al. |
| 7,146,253 B2 | 12/2006 | Hoog et al. |
| 7,152,806 B1 | 12/2006 | Rosen |
| 7,155,305 B2 | 12/2006 | Hayes et al. |
| D535,573 S | 1/2007 | Barton et al. |
| 7,156,318 B1 | 1/2007 | Rosen |
| 7,159,789 B2 | 1/2007 | Schwendinger et al. |
| 7,181,317 B2 | 2/2007 | Amundson et al. |
| 7,240,289 B2 | 7/2007 | Naughton et al. |
| 7,246,087 B1 | 7/2007 | Ruppelt et al. |
| 7,257,397 B2 | 8/2007 | Shamoon et al. |
| 7,302,642 B2 | 11/2007 | Smith et al. |
| 7,327,250 B2 | 2/2008 | Harvey |
| 7,360,717 B2 | 4/2008 | Shah |
| D580,801 S | 11/2008 | Takach et al. |
| 7,451,017 B2 | 11/2008 | McNally |
| 7,505,914 B2 | 3/2009 | McCall |
| 7,510,126 B2 | 3/2009 | Rossi et al. |
| 7,542,867 B2 | 6/2009 | Steger et al. |
| 7,571,865 B2 | 8/2009 | Nicodem et al. |
| 7,614,567 B2 | 11/2009 | Chapman et al. |
| 7,634,504 B2 | 12/2009 | Amundson |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,908,211 B1 | 3/2011 | Chen et al. |
| 7,942,387 B2 | 5/2011 | Forkosh |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,083,154 B2 | 12/2011 | Schultz et al. |
| 8,087,593 B2 | 1/2012 | Leen |
| 8,091,795 B1 | 1/2012 | McLellan et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,170,720 B2 | 5/2012 | Amundson et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,219,249 B2 | 7/2012 | Harrod et al. |
| 8,219,251 B2 | 7/2012 | Amugdson et al. |
| 8,219,258 B1 | 7/2012 | Almeida et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,332,075 B2 | 12/2012 | Harrod et al. |
| 8,346,396 B2 | 1/2013 | Amundson et al. |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,571,518 B2 | 10/2013 | Imes et al. |
| 8,587,445 B2 | 11/2013 | Rockwell |
| 8,606,409 B2 | 12/2013 | Amundson et al. |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,798,804 B2 | 8/2014 | Besore et al. |
| 8,810,454 B2 | 8/2014 | Cosman |
| 8,826,165 B2 | 9/2014 | Harrod et al. |
| 8,840,033 B2 | 9/2014 | Steinberg |
| 8,874,129 B2 | 10/2014 | Forutanpour et al. |
| 8,876,013 B2 | 11/2014 | Amundson et al. |
| 8,886,178 B2 | 11/2014 | Chatterjee |
| 8,890,675 B2 | 11/2014 | Ranjan et al. |
| 8,903,552 B2 | 12/2014 | Amundson et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,183,530 B2 | 11/2015 | Schwarz et al. |
| 9,215,560 B1 | 12/2015 | Jernigan |
| 9,219,983 B2 | 12/2015 | Sheshadri et al. |
| 9,256,230 B2 | 2/2016 | Matsouka et al. |
| 2001/0029585 A1 | 10/2001 | Simon et al. |
| 2001/0052459 A1 | 12/2001 | Essalik et al. |
| 2002/0011923 A1 | 1/2002 | Cunningham et al. |
| 2002/0022991 A1 | 2/2002 | Sharood et al. |
| 2002/0092779 A1 | 7/2002 | Essalik et al. |
| 2002/0147006 A1 | 10/2002 | Coon et al. |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2005/0172056 A1 | 8/2005 | Ahn |
| 2006/0063522 A1 | 3/2006 | McFarland |

(56) References Cited

U.S. PATENT DOCUMENTS

| | | | |
|---|---|---|---|
| 2006/0097063 A1 | 5/2006 | Zeevi | |
| 2007/0037605 A1 | 2/2007 | Logan | |
| 2007/0099626 A1 | 5/2007 | Lawrence et al. | |
| 2007/0114295 A1 | 5/2007 | Jenkins | |
| 2007/0249319 A1 | 10/2007 | Faulkner et al. | |
| 2007/0276911 A1* | 11/2007 | Bhumkar | G06Q 10/107 709/206 |
| 2008/0094230 A1 | 4/2008 | Mock et al. | |
| 2009/0143880 A1 | 6/2009 | Amundson et al. | |
| 2010/0034386 A1 | 2/2010 | Choong et al. | |
| 2010/0081375 A1 | 4/2010 | Rosenblatt et al. | |
| 2010/0127854 A1 | 5/2010 | Helvick et al. | |
| 2010/0156628 A1 | 6/2010 | Ainsbury et al. | |
| 2010/0261465 A1 | 10/2010 | Rhoads et al. | |
| 2011/0153525 A1 | 6/2011 | Benco et al. | |
| 2012/0172027 A1 | 7/2012 | Partheesh et al. | |
| 2012/0191257 A1 | 7/2012 | Corcoran et al. | |
| 2012/0209730 A1 | 8/2012 | Garrett | |
| 2013/0073094 A1 | 3/2013 | Knapton et al. | |
| 2013/0204441 A1 | 8/2013 | Sloo et al. | |
| 2013/0225196 A1 | 8/2013 | James et al. | |
| 2013/0231137 A1 | 9/2013 | Hugie et al. | |
| 2013/0310053 A1 | 11/2013 | Srivastava et al. | |
| 2013/0318217 A1* | 11/2013 | Imes | F24F 11/006 709/221 |
| 2013/0331087 A1 | 12/2013 | Shoemaker et al. | |
| 2014/0031989 A1 | 1/2014 | Bergman et al. | |
| 2014/0031991 A1 | 1/2014 | Bergman et al. | |
| 2014/0156087 A1 | 6/2014 | Amundson | |
| 2014/0164118 A1 | 6/2014 | Polachi | |
| 2014/0172176 A1 | 6/2014 | Deilmann et al. | |
| 2014/0200718 A1 | 7/2014 | Tessier | |
| 2014/0244048 A1 | 8/2014 | Ramachandran et al. | |
| 2014/0266635 A1 | 9/2014 | Roth et al. | |
| 2014/0277762 A1 | 9/2014 | Drew | |
| 2014/0316581 A1* | 10/2014 | Fadell | F24F 11/0009 700/276 |
| 2014/0324229 A1 | 10/2014 | Leen et al. | |
| 2014/0330435 A1 | 11/2014 | Stoner et al. | |
| 2014/0337123 A1 | 11/2014 | Neurenberg et al. | |
| 2014/0349672 A1 | 11/2014 | Kern et al. | |
| 2015/0168933 A1 | 1/2015 | Klein et al. | |
| 2015/0065161 A1 | 3/2015 | Ganesh et al. | |
| 2015/0140994 A1 | 5/2015 | Partheesh et al. | |
| 2015/0141045 A1 | 5/2015 | Qiu et al. | |
| 2015/0148963 A1 | 5/2015 | Klein et al. | |
| 2015/0163631 A1* | 6/2015 | Quam | F24F 11/006 455/456.1 |
| 2015/0205310 A1 | 7/2015 | Amundson et al. | |
| 2015/0237470 A1 | 8/2015 | Mayor et al. | |
| 2015/0301543 A1 | 10/2015 | Janoso et al. | |
| 2016/0007156 A1 | 1/2016 | Chiou et al. | |
| 2016/0170626 A1 | 6/2016 | Fadell et al. | |

FOREIGN PATENT DOCUMENTS

| | | |
|---|---|---|
| DE | 29600654 | 4/1996 |
| DE | 198405522 | 3/2000 |
| EP | 0070414 | 1/1983 |
| EP | 0332957 | 9/1989 |
| EP | 0434926 | 7/1991 |
| EP | 0978692 | 2/2000 |
| EP | 0678204 | 3/2000 |
| EP | 0985994 | 3/2000 |
| EP | 1074009 | 2/2001 |
| EP | 1515289 | 3/2005 |
| FR | 2711230 | 4/1995 |
| MX | 2012000906 | 9/2012 |
| SI | 20556 | 10/2001 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 01/93779 | 12/2001 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | WO 2012/000107 | 1/2012 |
| WO | WO 2013/170791 | 11/2013 |
| WO | WO 2014/016705 | 1/2014 |
| WO | WO 2014/047501 | 3/2014 |
| WO | WO 2014/144323 | 9/2014 |
| WO | WO 2014/197320 | 12/2014 |

OTHER PUBLICATIONS

Ng, Simon, "How to Create UIPageViewController Using Storyboard", Appcoda.com, Nov. 25, 2013 (accessed on Jan. 9, 2018 from <<https://www.appcoda.com/uipageviewcontrollerstoryboard-tutorial/>>).*

Macworld, "Add time and location-based notifications to reminders", Macworld.com, May 1, 2014 (accessed Jan. 9, 2018 from <<https://www.macworld.com/article/2150163/add-time-and-location-based-notifications-toreminders.html>>).*

Honeywell, "Magic Stat Programming and Installation Instructions," 14 pages, 1993.

"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.

"CorAccess Systems/In Home," http://web.archive.org/web20011212084427/www.coraccess.com/home.html, 1 page, copyright 2001, printed Aug. 19, 2004.

"HAI Company Background," http://www.homeauto.com/AboutHAI/abouthai_main.htm, 2 pages, printed Aug. 19, 2004.

"High-Tech Options Take Hold in New Homes-200-08-28-Dallas Business Journal," http://bizjournals.com/dallas/stories/2000/08/28/focus4, 3 pages, dated Aug. 28, 2008, printed Aug. 19, 2004.

"Home Toys Review—TouchLinc," http://www.hometoys.com//htinews/aug99/reviews/touchlinc.htm, 3 pages, dated Aug. 1999, printed Aug. 20, 2004.

"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.

"Product Review—Philips Pronto Remote Control," http://hometheaterhifi.com/volume_6_2/philipsprontoremotecontrol.html, 5 pages, dated May 1999, printed Aug. 20, 2004.

"RC X10 Automation Forum: Control Your Heating and Cooling System with Pronto (1/1)," http://www.remotecentral.com/cgi-bin/mboard/rc-x10/thread.cgi?12, 2 pages, dated Apr. 23, 1999, printed Aug. 20, 2004.

"Spotlight on Integrated Systems," Custom Builder, V8, N2, p. 66(6), Mar.-Apr. 1993.

"Vantage Expands Controls for Audio/Video, HVAC and Security," http://www.Hometoys.com/htinews/aug99/realease/vantage03.htm, 2 pages, dated Aug. 3, 1999, printed Aug. 20, 2004.

Action Closing Prosection for Reexam Control No. 95/002,041, Mailed Jul. 5, 2013.

ADI, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 4 pages, May 2001; First Sale Feb. 2001.

ADT Security Systems, "iCenter Advanced User Interface 8142ADT User Guide," pp. 1-136, 2001.

Aprilaire Electronic Thremostats Models 8344, 8346, 8348, 8363, 8365, 8366 Operating Instructions, 8 pages, prior to Dec. 2, 2003.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

Balaji et al., "Sentinel: Occupancy Based HVAC Actuation Using Existing WiFi Infrastructure Within Commercial Buildings," SenSys '13, 14 pages, Nov. 11-15, 2015.

(56) References Cited

OTHER PUBLICATIONS

Blake et al., "Seng 310 Final Project Demo Program," Illustration, 3 pages, Apr. 6, 2001.
Blake et al., "Seng 310 Final Project," Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owner's Manual, pp. 1-17, 2001.
BRK Electronics Maximum Protection Plus Ultimate Convenience Smoke Alarm, 24 pages, prior to Dec. 2, 2003.
BRK First Alert, User's Manual, Smoke and Fire Alarms, pp. 1-7, Nov. 2002.
Bryant, "Installation and Start-Up Instructions Evolution Control SYSTXBBUID01," 12 pages, 2004.
Business Wire, "MicroTouch Specialty Products Group to Capitalize on Growing Market for Low-Cost Digital Matrix Touchscreens,"pp. 1174 (2 pages), Jan. 6, 1999.
Cardio Manual, available at http://www.secant.ca/en/documentation/cardio2é-Manual.pdf, Cardio Home Automation Inc., 55 pages, printed Sep. 28, 2004.
Cardio, by Secant; http://www.hometoys.com/htinews/apr98/review/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Dec. 2, 2003.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humididty Control, Outdoor UHF Temperature Transmitter 217531, 19 pages, Printed Sep. 15, 2004.
"Petition for Inter Partes Review of U.S. Pat. No. 8,571,518 Pursuant to 35 U.S.C. 311-319, 37 CFR 42," Inventor lmes et al., dated Oct. 29, 2014.
File History for ReExam Control No. 95/002,041, U.S. Pat. No. 7,634,504, ReExamination Filed Jul. 18, 2012.
U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
U.S. Appl. No. 15/048,902, filed Feb. 19, 2016.
CorAccess, "Companion 6," User Guide, pp. 1-20, Jun. 17, 2002.
Danfoss RT51/51 RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Do, "Programmable Communicating Thermostats for Demand Response in California," DR ETD Workshop, 26 pages, Jun. 11, 2007.
Domotique Secant Home Automation—Web Page, available at http://www.secant.ca/en/company/default.asp, 1 page, printed Sep. 28, 2004.
Firex Smoke Alarm, Ionization Models AD, ADC Photoelectric Model Pad, 4 pages, prior to Dec. 2, 2003.
Freudenthal et al., "Communicating Extensive Smart Home Functionality to Users of All Ages: The Design of a Mixed-Initiative Multimodal Thermostat-Interface," pp. 34-39, Mar. 12-13, 2001.
Gentex Corporation, 9000 Series, Photoelectric Type Single Station/Multi-Station Smoke Alarms AC Powered with Battery Backup, Installation Instructions—Owner's Information, pp. 9-1 to 9-6, Jan. 1, 1993.
Gentex Corporation, HD135, 135° Fixed Temperature Heat Detector AC Powered, 120V, 60Hz with Battery Backup, Installation Instructions—Owner's Information, pp. 1-5, Jun. 1, 1998.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602 A, B, C, D and TS8602 A, C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Electromechanical Thermostats," 2 pages, 2002.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Ausust 29, 2000; Picture of Web Pad Device with touch Screen, 1 page; and screen shots of WebPad Device, 4 pages.
Honeywell, "Vision Pro 8000 Touchscreen Programmable Thermostat," Honeywell International Inc., 40 pages, 2004.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://www.cc.gatech.edu/computing/classes/cs6751_94_fall/groupc/climate-2/node1.html, "Contents," 53 pages, printed Sep. 20, 2004.
http://www.hometoys.com/htinews/apr99/releases/hal01.htm, HTI News Release, pp. 1-3.
http://wwvv.ritetemp.info/rtMenu_13.html, RiteTemp 8082, 6 pages, printed Jun. 20, 2003.
http://www.thermostatsales.com, Robershaw, "9610 Digital Programmable Thermostat," 3 pages, printed Jun. 17, 2004.
http://www.thermostatsales.com, Robershaw, "9700 Digital Programmable Thermostat," 3 pages, printed Jun. 17, 2004.
http://www.thermostatsales.com, Robershaw, "9710 Digital Programmable Thermostat," 3 pages, printed Jun. 17, 2004.

(56) References Cited

OTHER PUBLICATIONS http://www.thermostatsales.com, Robershaw, "9720 Digital Programmable Thermostat," 3 pages, printed Jun. 17, 2004.
http:/IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Hunter, "44200/44250," Owner's Manual, 32 pages, printed prior to Dec. 2, 2003.
Hunter, "44300/44350," Owner's Manual, 35 pages, printed prior to Dec. 2, 2003.
Hunter, "Auto Saver 550," Owner's Manual Model 44550, 44 pages, printed prior to Dec. 2, 2003.
Install Guide for Ritetemp Thermostat 8082, 6 pages, 2002.
Invensys Deluxe Programmable Thermostats 9700, 9701, 9715, 9720, User's Manual, 21 pages, prior to Dec. 2, 2003.
Lennox, "Network Control Panel (NCP)," User's Manual, 18 pages, Nov. 1999.
Lux TX9000 Installation, 3 pages, prior to Dec. 2, 2003.
Lux, "511 Series Smart Temp Electronic Thermostat," Owner's Manual, 3 pages, printed prior to Dec. 2, 2003.
Lux, "600 Series Smart Temp Electronic Thermostat," Owner's Manual, 3 pages, printed prior to Dec. 2, 2003.
Lux, "602 Series Multi-Stage Programmable Thermostat," Owner's Manual, 3 pages, printed prior to Dec. 2, 2003.
Lux, "605/2110 Series Programmable Heat Pump Thermostat," Owner's Manual, 3 pages, printed prior to Dec. 2, 2003.
Lux, "700/9000 Series Smart Temp Electronic Thermostat," Owner's Manual, 3 pages, printed prior to Dec. 2, 2003.
Lux, "ELV1 Programmable Line Voltage Thermostat," Owner's Manual, 3 pages, printed prior to Dec. 2, 2003.
Lux, "PSPH521 Series Programmable Heat Pump Thermostat," Owner's Manual, 3 pages, printed prior to Dec. 2, 2003.
Lux, "TX1500 Series Smart Temp Electronic Thermostat," Owner's Manual, 6 pages, printed prior to Dec. 2, 2003.
Lux, "TX500 Series Smart Temp Electronic Thermostat," Owner's Manual, 3 pages, printed prior to Dec. 2, 2003.
MagicStat, "Electronic, Programmable Thermostat, Owner's Manual," 23 pages. 1986.
Matty, "Advanced Energy Management for Home Use," IEEE Transactions on Consumer Electronics, vol. 35, No. 3, pp. 584-588, 1989.
Metasys, "HVAC PRO for Window's User's Manual," 308 pages, 1998.
Mobile Integrated Solutions, LLC, "MobiLinc Take Control of Your Home, MobiLinc and Geo-Fence Awareness," 9 pages, downloaded Mar. 27, 2015.
Mounting Template for Ritetemp Thermostat 8082, 1 page, 2002.
Operation manual for Ritetemp Touch Screen Thermostat 8082, 8 pages, 2002.
Pan et al., "A Framework for Smart Location-Based Automated Energy Controls in a Green Building Testbed," 6 pages, downloaded Jan. 30, 2015.
Proliphix Inc., "Web Enabled IP Thermostats," 2 pages, prior to Dec. 2, 2003.
Quick Start Guide for Ritetemp Thermostat 8082, 1 page, 2002.
Raji, "Smart Networks for Control," IEEE Spectrum, pp. 49-55, 1994.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Dec. 2, 2003.
Sealed Unit Parts Co., Inc., Supco & CTC Thermostats . . . Loaded with Features, Designed for Value!, 6 pages, prior to Dec. 2, 2003.
SmartThings Inc., "2 Ecobee Si Thermostat + Geofencing," 17 pages, downloaded Nov. 3, 2014.
Totaline Model P474-1035 Owner's Manual Programmable 5-2 Day Digital Thermostat, pp. 1-21, prior to Dec. 2, 2003.
Totaline Star CPE230RF, Commercial Programmable Thermostat Wireless Transmitter, Owner's Manual, pp. 1-16, Oct. 1998.
Totaline Star P/N. P474-0130 Non-Programmable Digital Thermostat Owner's Manual, pp. 1-22, prior to Dec. 2, 2003.
Totaline, "1 for All Programmable Digital Thermostat," Owner's Manual P/N. P374-1100FM, 23 pages, Nov. 1998.
Totaline, "1 for All Programmable Digital Thermostat," Owner's Manual P/N. P474-1050, 21 pages, Nov. 1998.
Totaline, "1 for All Programmable Digital Thermostat," Owner's Manual P/N. P374-1100, 24 pages, Apr. 2001.
Totaline, "Instructions P/N P474-1010," Manual, 2 pages, Dec. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Programmable Thermostat," Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, Copyright 1999-2000.
Warmly Yours, "Model TH111GFCI-P (120 VAC)," Manual, pp. 1-4, printed prior to Dec. 2, 2003.
White-Rodgers 1F80-224 Programmable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, "Comfort-Set 90 Series Thermostat," Manual, pp. 1-44, printed prior to Dec. 2, 2003.
White-Rodgers, "Comfort-Set III Thermostat," Manual, pp. 1-44, printed prior to Dec. 2, 2003.
White-Rodgers, "Installation Instructions for Heating & Air Conditioning IF72 5/2 Day Programmable Heat Pump Thermostat," 8 pages, printed prior to Dec. 2, 2003.
White-Rodgers, "Installation Instructions for Heating & Air Conditioning IF78 5/2 Day Programmable Thermostat," 7 pages, printed prior to Dec. 2, 2003.
White-Rodgers, Comfort-Set 90 Series Premium, 4 pages, prior to Dec. 2, 2003.
White-Rodgers, IF80-240 "(for Heating Only systems) Programmable Electronic Digital Thermostat," Installation and Operation Instructions, 8 pages, printed prior to Dec. 2, 2003.
White-Rodgers, IF80-241, "Programmable Electronic Digital Thermostat," Installation and Operation Instructions, 6 pages, printed prior to filing date.
White-Rodgers, IF80-261, "Programmable Electronic Digital Thermostat," Installation and Operation Instructions, 8 pages, printed prior to Dec. 2, 2003.
White-Rodgers, IF81-261, "Programmable Electronic Digital Multi-Stage Thermostat," Installation and Operation Instructions, 8 pages, printed prior to Dec. 2, 2003.
White-Rodgers, IF82-261, "Programmable Electronic Digital Heat Pump Thermostat," Installation and Operation Instructions, 8 pages, prior to Dec. 2, 2003.
www.icmcontrols.com, Simplecomfort, SC3000 Single Stage Heat/Single Stage Cool or Single Stage Heat Pump/Manual Changeover, 1 page, printed prior to Dec. 2, 2003.
www.icmcontrols.com, Simplecomfort, SC3001 Single Stage Heat/Single Stage Cool or Single Stage Heat Pump/Manual Changeover, 1 page, printed prior to Dec. 2, 2003.
www.icmcontrols.com, Simplecomfort, SC3006 Single Stage Heat/Single Stage Cool or Single Stage Heat Pump/Manual Changeover, 1 page, printed prior to Dec. 2, 2003.
www.icmcontrols.com, Simplecomfort, SC3201 2 Stage Heat Pump Manual Changeover, 1 page, printed prior to Dec. 2, 2003.

(56) References Cited

OTHER PUBLICATIONS www.icmcontrols.com, Simplecomfort, SC3801 2 Stage Heat/2 Stage Cool 2 Stage Heat Pump/Audio Changeover, 1 page, printed Dec. 2, 2003.

* cited by examiner

TRIAGE OF INITIAL SCHEDULE SETUP FOR AN HVAC CONTROLLER

TECHNICAL FIELD

The present disclosure relates to Heating, Ventilation, and/or Air Conditioning (HVAC) systems, and more particularly to methods and systems for setting up such HVAC systems.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, a user may be overwhelmed by what seems to be an ever increasing number of possible settings and selections that can be made when setting up their HVAC controller. In some cases, it may be beneficial to package and present certain settings to the user in a manner that helps guide or steer the user toward making appropriate setting choices for their HVAC controller.

SUMMARY

The disclosure is directed to methods and systems for setting up HVAC controllers for a particular installation site. In one example, an HVAC controller may be configured to control at least part of an HVAC system in accordance with any one of several different scheduling options, including but not limited to location-based scheduling options (e.g. geo-fencing), time-based scheduling options, and no schedule. In some cases, a user may be guided through several different scheduling options in a methodical, easy to understand sequence of information displays.

In a particular example of the disclosure, a non-transitory, computer-readable medium may contain program instructions for facilitating a user in setting up schedule settings of an HVAC controller. In some cases, execution of the program instructions by one or more processors causes a plurality of screens to be displayed on a user interface, the plurality of screens permitting a user to select one of several scheduling setup procedures, each of the several scheduling setup procedures being selectable for use via a different one of the plurality of screens. The plurality of screens may include a first screen that has an acceptance button that when selected by the user selects a first scheduling setup procedure as well as a navigation element that the user can use to move to a second screen of the plurality of screens that permit a user to select one of several scheduling setup procedures. In some cases, and if the user selects the acceptance button on the first screen, one or more subsequent screens may be displayed on the user interface that allow the user to make setting selections in accordance with the first scheduling setup procedure. In some cases, and if the user selects the navigation element on the first screen, the second screen of the plurality of screens is displayed in the user interface. The second screen may include an acceptance button that when selected by the user selects a second scheduling setup procedure. If the user selects the acceptance button on the second screen, one or more subsequent screens on the user interface may be displayed that allow the user to make setting selections in accordance with the second scheduling procedure. In some cases, the first scheduling setup procedure sets up the HVAC Controller to use location-based scheduling (e.g. geo-fencing), and the second scheduling setup procedure sets up the HVAC Controller to use time-based scheduling. This is just one example.

In another example of the disclosure, a wireless mobile device may be configured to facilitate setup of an HVAC controller. The wireless mobile device may, for example, include a user interface, a wireless communications port and a controller that is coupled with the user interface and the wireless communications port. In some cases, the controller may be configured to display on the user interface a plurality of screens that permit a user to select one of several scheduling setup procedures, each of the several scheduling setup procedures being selectable for use via a different one of the plurality of screens. The plurality of screens include a first screen that has an acceptance button that when selected by the user selects a first scheduling setup procedure. The first screen may also include a navigation element that the user can use to move to a second screen of the plurality of screens that permit a user to select one of several scheduling setup procedures. In some cases, and if the user selects the acceptance button on the first screen, the controller is configured to display one or more subsequent screens on the user interface that allow the user to make setting selections in accordance with the first scheduling setup procedure. In some cases, and if the user selects the navigation element on the first screen, the controller is configured to display on the user interface the second screen of the plurality of screens. The second screen may include an acceptance button that when selected by the user selects a second scheduling setup procedure. If the user selects the acceptance button on the second screen, the controller may be configured to display one or more subsequent screens on the user interface that allow the user to make setting selections in accordance with the second scheduling setup procedure. In some cases, the first scheduling setup procedure may pertain to utilizing geofencing in operation of the HVAC controller, and the second scheduling setup procedure may pertain to utilizing a programmable schedule in operation of the HVAC controller with no geo-fencing, but this is just an example.

In another example of the disclosure, a method of guiding a user in setting up an HVAC controller includes querying the user to determine if the user wishes to operate the HVAC controller in accordance with a location-based procedure and accepting a first indication from the user. If the first indication indicates that the user wishes to operate the HVAC controller in accordance with the location-based procedure, the user is allowed to make setting selections in accordance with the location-based procedure. If the first indication indicates that the user does not wish to operate the HVAC controller in accordance with the location-based procedure, the method may include querying the user to determine if the user wishes to operate the HVAC controller in accordance with a time-based procedure, and accepting a second indication from the user. If the second indication indicates that the user wishes to operate their HVAC controller in accordance with the time-based procedure, the user is allowed to make setting selections in accordance with the time-based procedure.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following description of various illustrative embodiments of the disclosure in connection with the accompanying drawings, in which.

Figure 1:
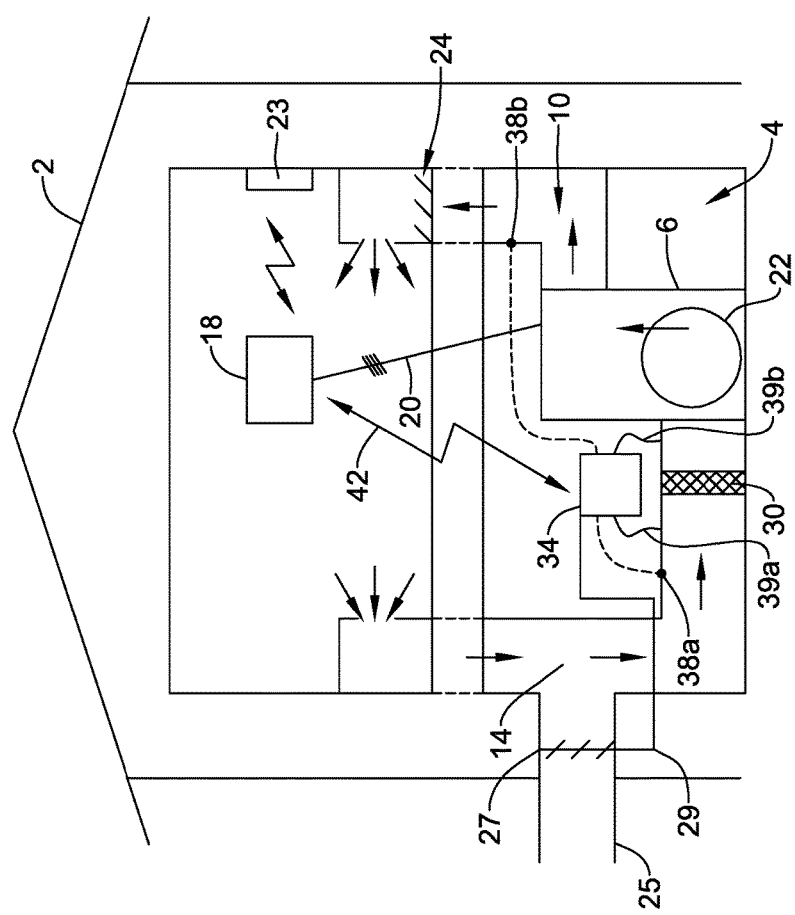
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The type of HVAC system and/or the particular HVAC equipment used may depend on the geographic region. For example, natural gas fired forced air furnaces may be more common in the northern regions of the Unites States, while electric heat may be more common in the southwest. Boiler systems may be more common in the northeast region of the United States, as well as in Europe. These are just some examples.

The illustrative forced air type HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature).

In some cases, the HVAC system 4 may include ventilation. There are a number of different types of ventilation systems. Examples include passive ventilation or mechanical ventilation. Mechanical ventilation may, for example, include an actuatable damper 27 that may be disposed within a duct 25 and connected to the return air duct 14. When the damper 27 is open, fresh air from outside may be pulled into the return air duct 14 and thus into the building 2. In some cases, the actuatable damper 27 may be connected via a control line 29 to the EIM 34. It will be appreciated that additional examples of mechanical ventilation include an ERV (energy recovery ventilator) or an HRV (heat recovery ventilator).

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
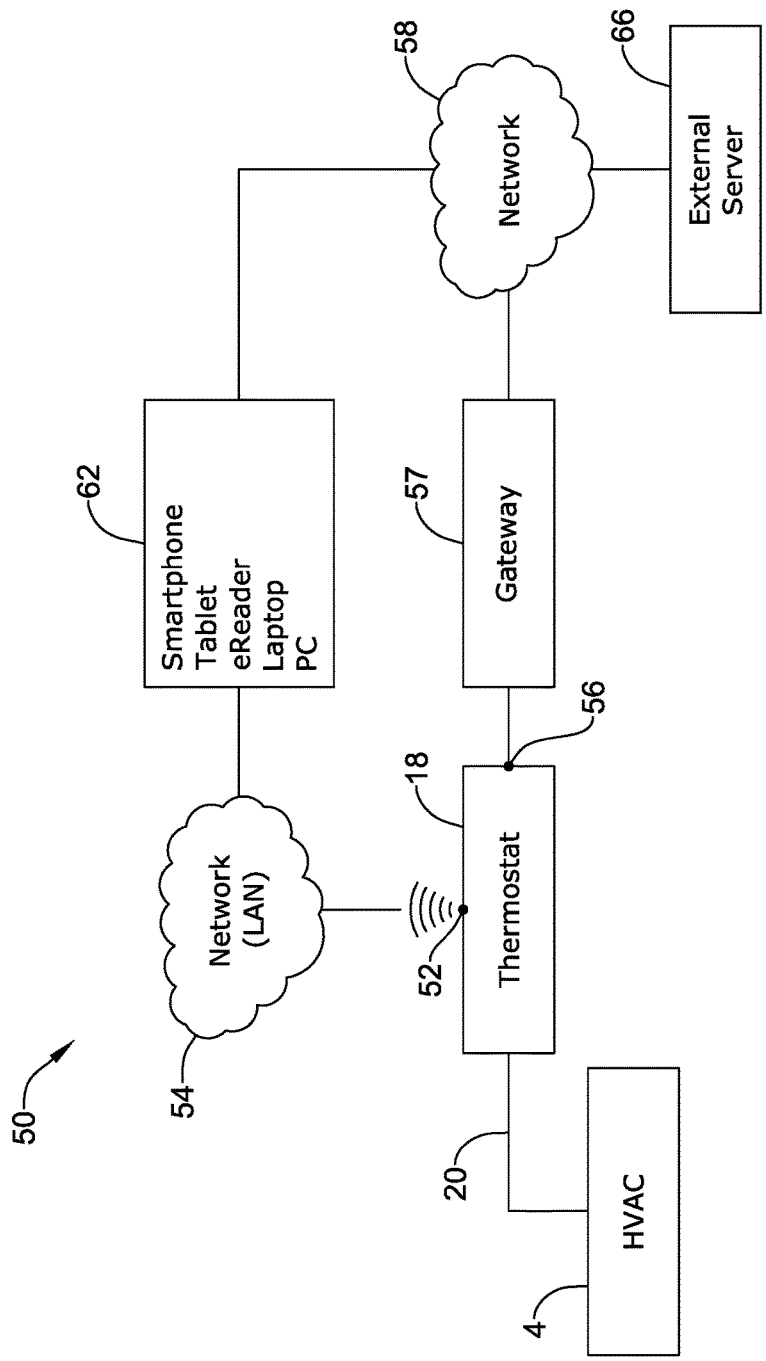
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, communications over a second network 58 may pass through a gateway 57, but this is not required in all cases. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature setpoints, humidity setpoints, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature setpoints, humidity setpoints, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a setpoint change. The change made at the HVAC controller 18 may be routed to the web server 66 and then from the web server 66 to the remote device 62 where it may be reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
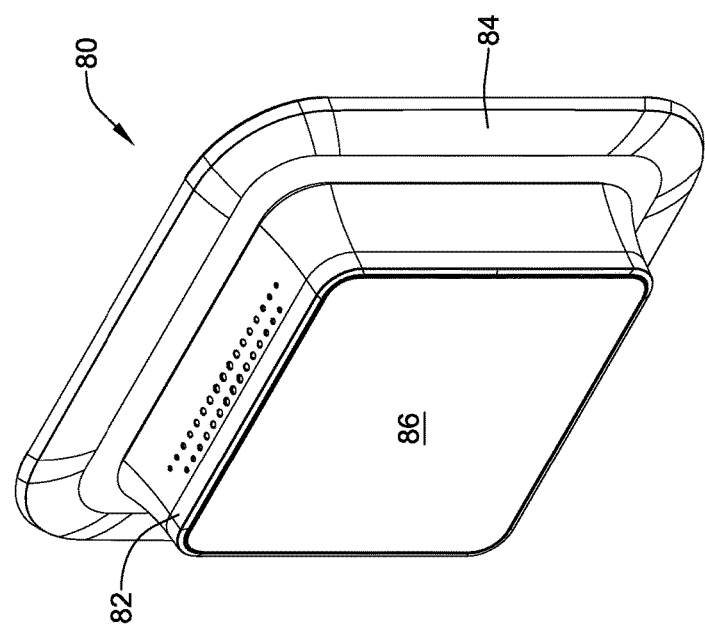
FIG. 3 is a perspective view of an illustrative thermostat assembly that may be used in the HVAC system of FIG. 1 or FIG. 2.

FIG. 3 is a perspective view of an illustrative thermostat assembly 80. In some instances, the thermostat assembly 80 may be considered as an example of the HVAC controller 18 referenced in FIGS. 1 and 2. In some instances, the thermostat assembly 80 may include a thermostat 82 and a trim piece 84. The thermostat 82 may include a user interface 86 which, in some cases, may be a touch screen display such as a fixed segment touch screen display or a dot matrix touch screen display. It will be appreciated that if the user interface 86 is a fixed segment touch screen display, the ability of the thermostat 82 to rearrange what is displayed on the user interface 86 may be somewhat limited. In some cases, it will be appreciated that a touch screen display may, for example, have any number of distinct touch points where the touch screen display is configured to sense that the touch point has been touched or is being touched. In some cases, the touch screen display may have a relatively limited number of distinct touch points in order to reduce costs, for example.

Figure 4:
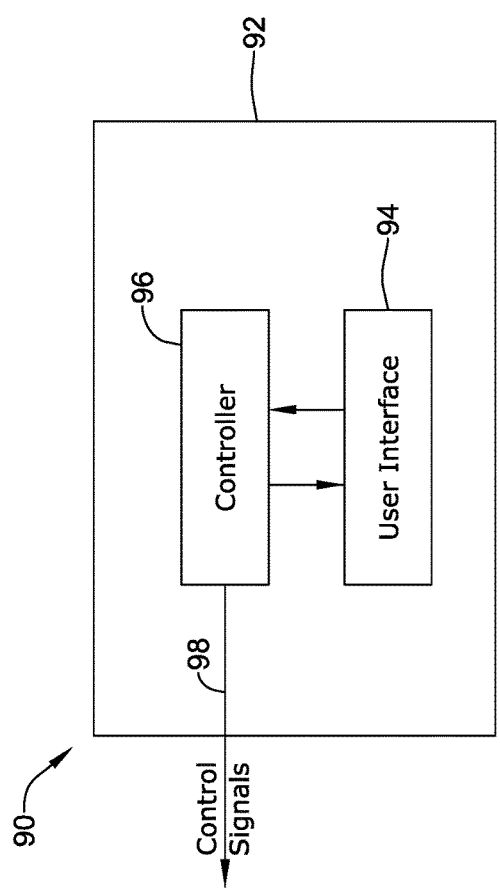
FIG. 4 is a schematic view of an illustrative HVAC controller that may, for example, form part of the HVAC system of FIG. 1 or FIG. 2.

FIG. 4 is a schematic view of an illustrative HVAC controller 90 that may, for example, be configured to control one or more HVAC components (such as but not limited to the HVAC component(s) 6 shown in FIG. 1 as part of the HVAC system 4) in accordance with one or more comfort parameters that define desired temperatures for particular time periods. In some cases, the HVAC controller 90 may utilize geofencing in controlling operation of the HVAC system 4 or portions thereof. In geofencing, a user may, for example, set one or more HOME comfort parameters that the HVAC controller 90 can use in controlling the HVAC system 4 when someone is home and one or more AWAY comfort parameters that the HVAC controller 90 can use in controlling the HVAC system 4 when nobody is home. Comfort parameters may include a heating temperature setpoint, a cooling temperature setpoint, ventilation setting, humidification and/or dehumidification settings, and/or any other suitable parameters or settings. In some cases, geofencing relies upon knowing the location of each user's mobile device (such as but not limited to a smartphone) relative to a pre-defined geofence boundary disposed about the home to determine if the home is occupied or unoccupied.

In some cases, the HVAC controller 90 may operate in accordance with a programmable schedule. In some cases, the programmable schedule may include a plurality of schedule time periods. For example, in some cases, the programmable schedule may include four different time periods for each day. In some cases, these four time periods may be identified as WAKE, AWAY, HOME and SLEEP. In some instances, the programmable schedule may include additional time periods. In some cases, the programmable schedule may include fewer than four distinct time periods. In some cases, different days of the week may have a different number of time periods.

In some instances, the programmable schedule may be known as a 7 day schedule, in which each of the seven days of the week may be uniquely programmed but are not required to be. In some cases, the programmable schedule may be known as a 5-2 schedule, in which each of the weekdays Monday through Friday share a first programmable schedule and the weekend days Saturday and Sunday share a second programmable schedule. In some cases, the programmable schedule may be known as a 5-1-1 schedule, in each of the weekdays Monday through Friday share a first programmable schedule, and Saturday and Sunday each can have their own unique schedule. In some cases, a user may decide not to use geofencing or a programmable schedule, but instead may elect to operate their HVAC controller in a manual mode. In a manual mode, the user would simply select a heating temperature setpoint for a heating mode and a cooling temperature setpoint for a cooling mode. If they are cold in the heating mode, the user could manually bump up the heating temperature setpoint a few degrees. If they are hot in the cooling mode, the user could manually drop the cooling temperature setpoint a few degrees.

In some cases, the HVAC controller 90 may include a housing 92. In some instances, the housing 92 may be considered as forming the outer structure of the thermostat 82 (FIG. 3), although this is not required in all cases. A user interface 94 may be housed by the housing 92 in such a way as to be accessible from outside of the housing 92. In some cases, for example, the user interface 94 may form a portion of an outer surface, such as the front of the outer surface, of the housing 92. In some cases, the user interface 94 may be a touch screen display. In some instances, the user interface 94 may be a fixed segment touch screen display, and may for example have a limited number of distinct touch points. In some cases, the user interface 94 may be a dot matrix touch screen display, and in some cases essentially an entire surface of the a dot matrix touch screen display 94 may provide touch points.

The illustrative HVAC controller 90 includes a controller 96 that may be configured to operate an algorithm that at least partially controls the HVAC system of the building, and outputs one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort setpoints used by the algorithm when controlling the at least part of the HVAC system of the building.

Figure 5:
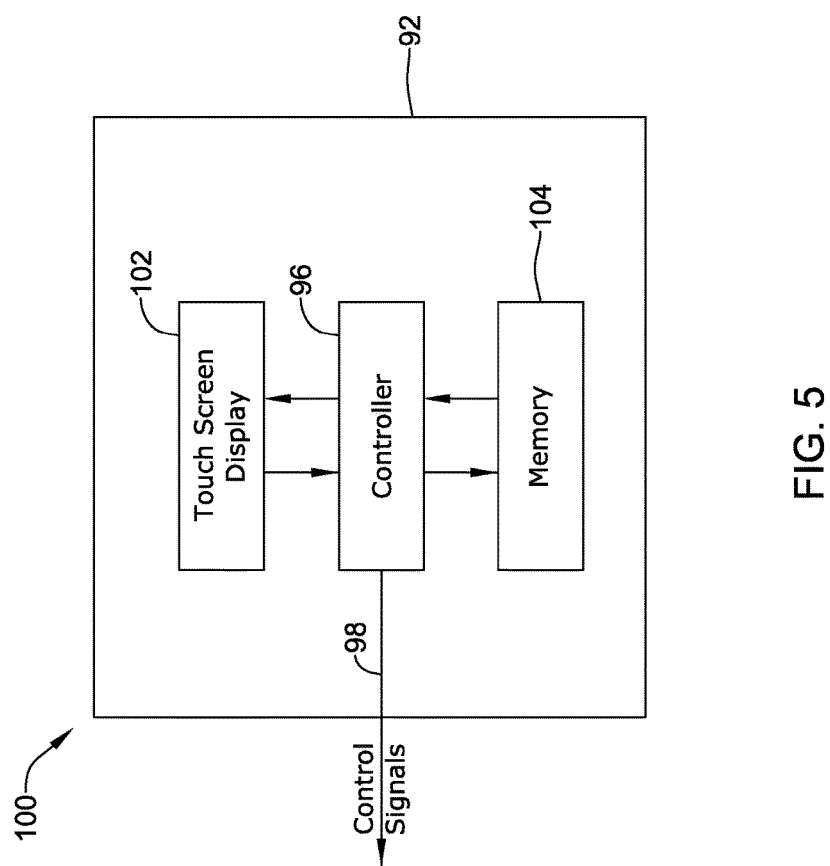
FIG. 5 is a schematic view of an illustrative HVAC controller that may, for example, form part of the HVAC system of FIG. 1 or FIG. 2.

FIG. 5 is a schematic view of an illustrative HVAC controller 100 that may, for example, be configured to control one or more HVAC components (such as but not limited to the HVAC component(s) 6 shown in FIG. 1 as part of the HVAC system 4. In some cases, the HVAC controller 100 may be considered as including any or all of the functionality described with respect to the HVAC controller 90, and vice versa. In some cases, the HVAC controller 100 may include a housing 92. In some instances, the housing 92 may be considered as forming the outer structure of the thermostat 82 (FIG. 3), although this is not required in all cases. A touch screen display 102 may be housed by the housing 92 in such a way as to be accessible from outside of the housing 92. In some cases, for example, the touch screen display 102 may form a portion of an outer surface, such as the front of the outer surface, of the housing 92. In some cases, the touch screen display 102 may be a fixed segment touch screen display, and may for example have a limited number of distinct touch points. In some cases, the touch screen display 102 may be a dot matrix touch screen display, and in some cases essentially an entire surface of the touch screen display 102 may provide touch points.

The illustrative HVAC controller 100 includes the controller 96 that may be configured to operate an algorithm that at least partially controls the HVAC system of the building, and outputs one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort setpoints used by the algorithm when controlling the at least part of the HVAC system of the building.

The HVAC controller 100 may include a memory 104 in order to store a plurality of equipment setup parameters that setup the HVAC controller to control the particular HVAC equipment that is used in the HVAC system of the building as well as one or more comfort parameters that define one or more comfort setpoints used by the HVAC controller when controlling the at least part of the HVAC system of the building. In some cases, the controller 96 may be operably coupled to the touch screen display 102 and to the memory 104. The controller 96 may be configured to control at least a portion of the HVAC system based at least in part on the plurality of equipment setup parameters.

Figure 6:
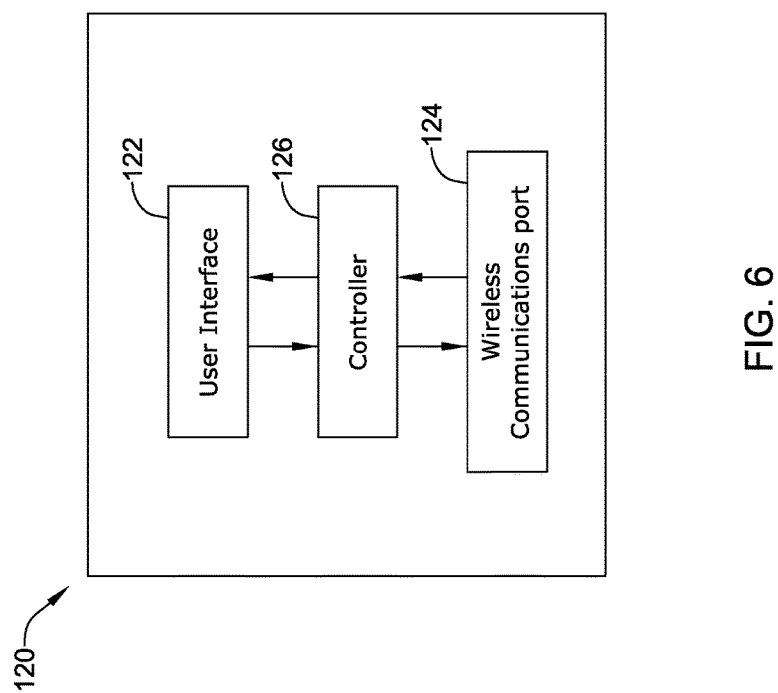
FIG. 6 is a schematic view of an illustrative mobile device that may, for example, be used in combination with the HVAC system of FIG. 1 or FIG. 2.

FIG. 6 is a schematic view of a mobile device 120 that may be used to facilitate setup of an HVAC controller. In some instances, the mobile device 120 may be considered as being an example of the remote wireless device 62 referenced in FIG. 2. In some cases, the mobile device 120 may include a user interface 122, a wireless communication port 124 and a controller 126 that is operatively coupled to the user interface 122 and the wireless communications port 124. In some cases, the user interface 122 may include or otherwise be a touch screen display that is configured to display information from the controller 126 as well as to solicit input from the user. The wireless communications port 124 may, for example, enable the mobile device 120 to communicate wirelessly with a network 54 (FIG. 2) and thus communicate with an HVAC controller such as the thermostat 18 (FIG. 2) and/or communicate with a network 58 (FIG. 2) and thus communicate with a server such as the external server 66 (FIG. 2) that can communicate with an HVAC controller.

In some cases, the controller 126 may be configured to display on the user interface 122 a plurality of screens that permit a user to select one of several scheduling setup procedures, where each of the several scheduling setup procedures are selectable for use via a different one of the plurality of screens. The plurality of screens may include a first screen that has an acceptance button that when selected by the user selects a first scheduling setup procedure, and a navigation element that the user can use to move to a second screen of the plurality of screens that permit the user to select one of several scheduling setup procedures. Examples of some of these screens are shown and described with respect to subsequent Figures.

In some cases, if the user selects the acceptance button on the first screen, the controller 126 may be configured to display one or more subsequent screens on the user interface 122 that allow the user to make setting selections in accordance with the first scheduling setup procedure. However, if the user selects the navigation element on the first screen, the controller 126 may be configured to display on the user interface 122 the second screen of the plurality of screens. The second screen may also include an acceptance button that when selected by the user selects a second scheduling setup procedure. If the user selects the acceptance button on the second screen, the controller 126 may be configured to display one or more subsequent screens on the user interface 122 that allow the user to make setting selections in accordance with the second scheduling setup procedure. In some cases, the first scheduling setup procedure may pertain to utilizing geofencing in operation of the HVAC controller, and the second scheduling setup procedure may pertain to utilizing a programmable schedule in operation of the HVAC controller with no geo-fencing. Once these settings have been determined, the controller 126 may be configured to communicate the setting selections via the wireless communications port 124 of the wireless mobile device 120. In some cases, the setting selections may be communicated directly to an HVAC controller, or to a remote server that is operatively coupled to an HVAC controller.

Figure 7:
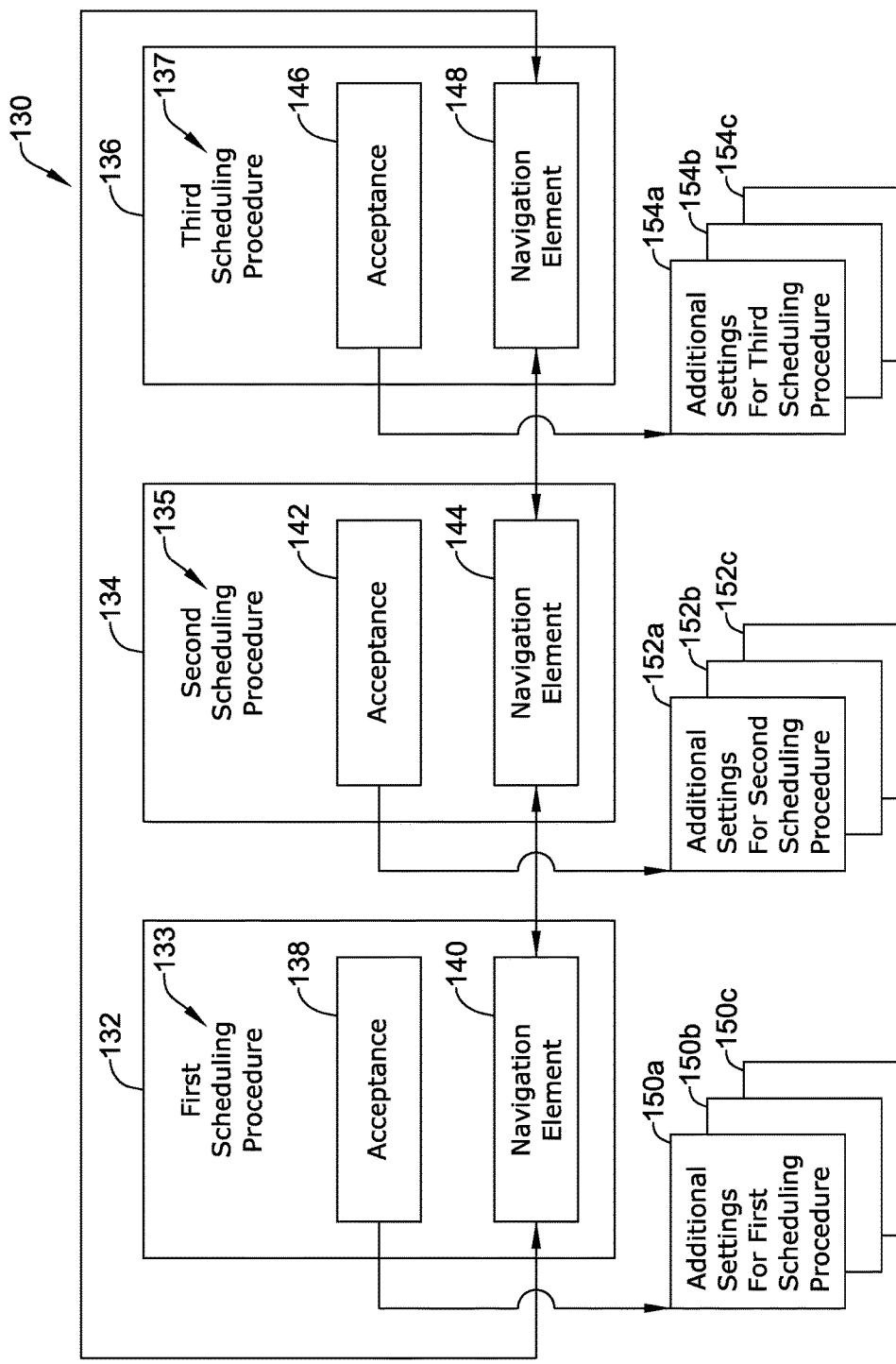
FIG. 7 is a schematic view of a series of screen displays that may, for example, be displayed by the HVAC controllers of FIGS. 4 and 5 and/or by the mobile device of FIG. 6.

FIG. 7 is a schematic view of a series of screen displays that may, for example, be displayed by the HVAC controllers of FIGS. 4 and 5 and/or by the mobile device of FIG. 6. An example series of screens includes a first screen 132, a second screen 134 and a third screen 136. It will be appreciated that this is merely illustrative, as in some cases the plurality of screens 130 may include four, five or more distinct screens. In some cases, the plurality of screens 130 may only include two screens, such as the first screen 132 and the second screen 134, and not include the third screen 136. In some cases, the first screen 132 may pertain to a first scheduling procedure as indicated by the FIRST SCHEDULING PROCEDURE icon 133, the second screen 134 may pertain to a second scheduling procedure as indicated by the SECOND SCHEDULING PROCEDURE icon 135, and the third screen 136, if included, may pertain to a third scheduling procedure as indicated by a THIRD SCHEDULING PROCEDURE icon 137. In some cases, for example, one of the scheduling procedures may pertain to geofencing, another may pertain to a time-based or programmable schedule, and another may pertain to a manual mode.

The first screen 132 may include an acceptance button 138 that may be used by the user to indicate that they wish to select the first scheduling procedure as well as a navigation element 140 that may be used by the user to indicate that they instead wish to move to another of the plurality of screens 130 that permit the user to select one of the other scheduling setup procedures. This may be construed as a rejection of the first scheduling procedure, or simply as an indication that they want to see what other scheduling options are available before making their final selection. In some cases, the navigation element 140 may be a button the use can select. In some cases, the navigation element 140 may represent a tab on a display, or even a swipe left or swipe right gesture. Similarly, the second screen 134 may include an acceptance button 142 and a navigation element 144. The acceptance button 142 on the second screen 134 may be used by the user to indicate that they wish to select the second scheduling procedure. The third screen 136, if included, may include an acceptance button 146 and a navigation element 148. The acceptance button 146 may be used by the user to indicate that they wish to select the third scheduling procedure. As indicated by the arrows, the navigation elements 140, 144 and 148 may be used to move between the plurality of screens 130 as shown.

In some cases, selecting the acceptance button 138 on the first screen 132 may cause the display of one or more screens 150A, 150B, 150C that enable the user to make additional selections or settings pertaining to the first scheduling procedure. In some cases, selecting the acceptance button 142 on the second screen 134 may cause display of one or more screens 152A, 152B, 152C that enable the user to make additional selections or settings pertaining to the second scheduling procedure. In some cases, selecting the acceptance button 146 on the third screen 136 may cause display of one or more screens 154A, 154B, 154C that enable the user to make additional selections or settings pertaining to the third scheduling procedure. While a total of three additional screens (150A, 150B, 150C or 152A, 152B, 152C or 154A, 154B, 154C) are shown, it will be appreciated that this is merely illustrative as some scheduling procedures may require additional screens for parameter setting and the like. Some scheduling procedures may require fewer screens.

In some cases, it can be seen that each of the plurality of screens 130, including the first screen 132, the second screen 134 and the third screen 136 may be considered as being at a common menu level as one can simply scroll or otherwise move linearly between each of the plurality of screens 130. The screens 150A, 150B, 150C may be considered as drilling down one level of hierarchy from the first screen 132. Similarly, the screens 152A, 152B, 152C may be considered as drilling down one level of hierarchy from the second screen 134. The screens 154A, 154B, 154C may be considered as drilling down one level of hierarchy from the third screen 136.

In some cases, the first scheduling setup procedure as referenced in the first screen 132 may pertain to utilizing geofencing in operation of the HVAC controller 90 (or 100). In some cases, one or more of the screens 150A, 150B, 150C may allow a user to select one or more of a home temperature, an away temperature and/or a geo-fence radius when using geofencing. For example, the screen 150A may permit entry of a heating temperature and a cooling temperature for use when the home is occupied, and the screen 150B may permit entry of heating and cooling temperatures for use when the home is unoccupied. The screen 150C may, for example, permit the user to view and/or edit a current geofencing radius or boundary. These are just examples.

In some cases, the first scheduling setup procedure may use geofencing along with a schedule in operation of the HVAC controller 90 (or 100). For example, geofencing may be used to determine if the home is occupied or unoccupied. When geofencing determines that the home is occupied, the HVAC controller 98 (or 100) may operate in accordance with a programmable schedule. When geofencing determines that the home is unoccupied, the HVAC controller 98 (or 100) may operate in accordance with an unoccupied setpoint. When so provided, one or more of the screens 150A, 150B, 150C may enable the user to select, for example, an AWAY temperature (for heating and/or cooling), a geo-fence radius, a WAKE time, a WAKE temperature (for heating and/or cooling), a sleep time and a SLEEP temperature (for heating and/or cooling).

In some cases, the second scheduling setup procedure as referenced in the second screen 134 may pertain to utilizing a programmable schedule in operation of the HVAC controller 90 (or 100) with no geo-fencing. In some cases, one or more of the screens 152A, 152B, 152C may allow a user to select or set one or more of a time and a temperature for each of two or more time periods. For example, screen 152A may enable the user to set a starting time and a heating temperature and/or a cooling temperature for a WAKE period. Screen 152B may enable the user to set a starting time and a heating temperature and/or a cooling temperature for a LEAVE period, and screen 152C may enable the user to set a starting time and a heating temperature and/or a cooling temperature for a RETURN period. Another screen (not specifically illustrated) may enable the user to set a starting time and a heating temperature and/or a cooling temperature for a SLEEP period. These are just examples.

In some cases, the third scheduling procedure may simply represent manual operation of the HVAC controller 98 (or 100). In some cases, however, the third scheduling procedure may pertain to utilizing geofencing in combination with a schedule in operation of the HVAC controller 90 (or 100). In some cases, one or more of the screens 154A, 154B, 154C may enable the user to select one or more of a HOME temperature (for heating and/or cooling), an AWAY temperature (for heating and/or cooling), a geo-fence radius, a WAKE time, a WAKE temperature (for heating and/or cooling), a sleep time and a SLEEP temperature (for heating and/or cooling).

Figure 8:
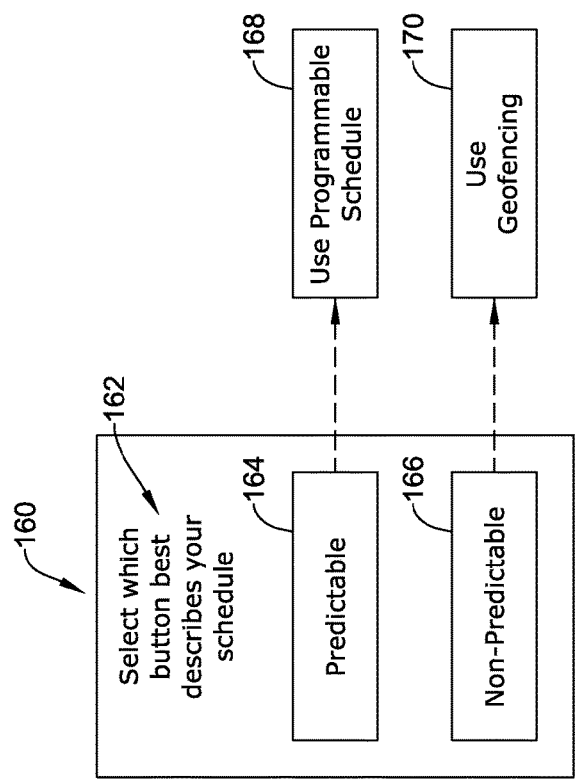
FIG. 8 is a schematic view of a screen display that may, for example, be displayed by the HVAC controllers of FIGS. 4 and 5 and/or by the mobile device of FIG. 6.

FIG. 8 is a schematic view of a screen 160 that may, for example, be displayed by the HVAC controllers of FIGS. 4 and 5 and/or by the mobile device of FIG. 6. In some cases, the screen 160 may be considered as representing another way to present scheduling options to a user. The example screen 160 includes some identifying text 162 that tells the user to select a button that most closely represents their typical schedule. In some cases, the identifying text 162 may ask or query the user if someone is typically home all day, for example. The screen 160 may include a PREDICTABLE button 164 and a NON-PREDICTABLE button 166. For example, if the user's schedule is fairly consistent day to day and/or week to week, they can press the PREDICTABLE button 164. This tells the controller 126 that a programmable schedule might be appropriate, as schematically illustrated as block 168. However, if the user's schedule is not consistent day to day and/or week to week, such as if some days the user works late, some days the user comes home early, etc., the user can press the NON-PREDICTABLE button 166. This tells the controller 126 that geofencing might be appropriate, as schematically illustrated as block 170. Once an appropriate scheduling procedure is determined, that scheduling procedure may be presented to the user first for acceptance by the user. For example, the appropriate scheduling procedure may be assigned to the first scheduling procedure screen 132 of FIG. 7.

Figure 9:
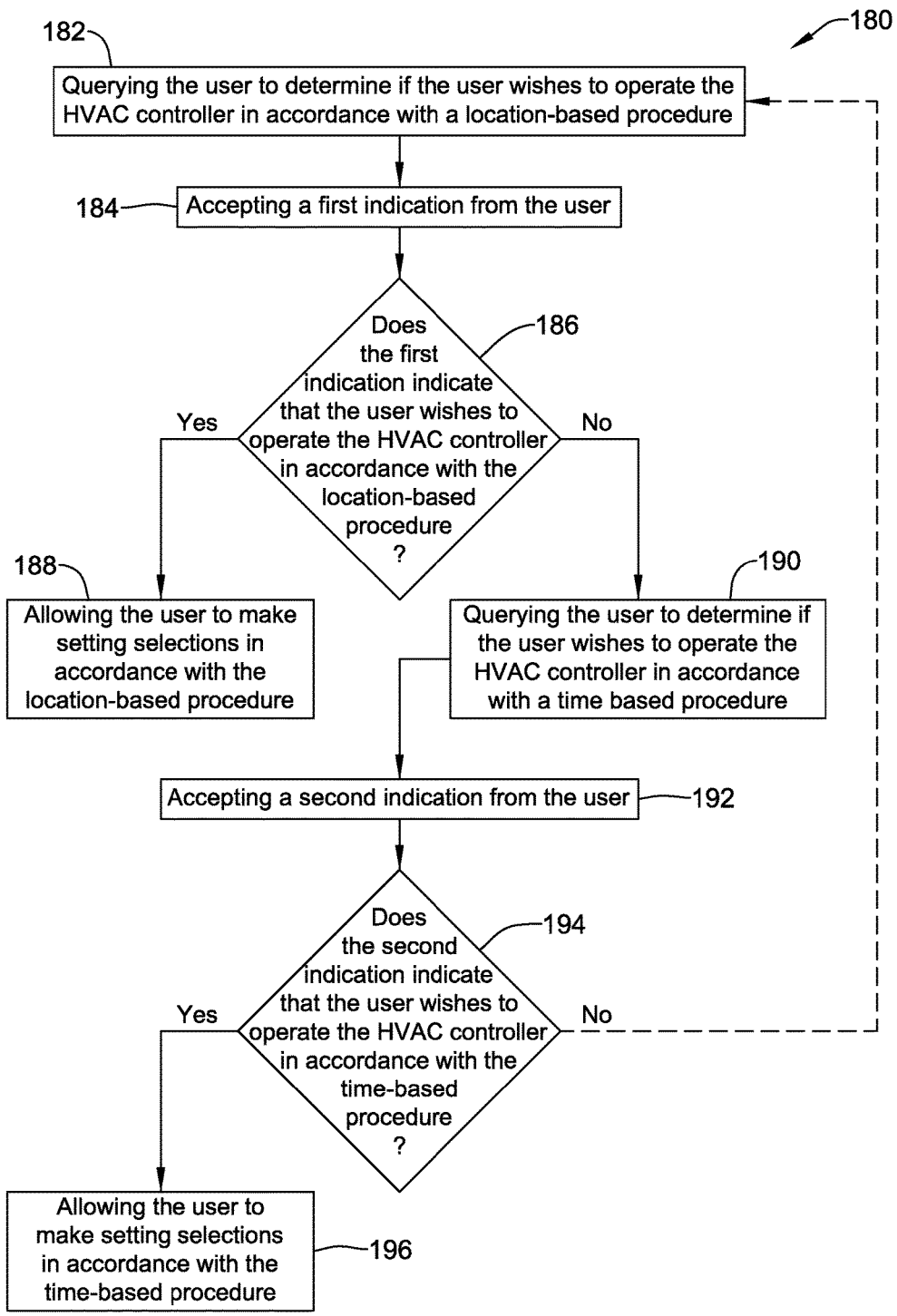
FIG. 9 is a flow diagram showing an illustrative method of guiding a user in setting up an HVAC controller.

FIG. 9 provides a schematic view of an illustrative method 180 of guiding a user in setting up an HVAC controller. In some cases, the HVAC controller may be the HVAC controller 90 (FIG. 4) or the HVAC controller 100 (FIG. 5). The illustrative method 180 begins with querying the user to determine if the user wishes to operate the HVAC controller in accordance with a location-based procedure, as indicated at block 182. A first indication may be accepted from the user at block 184. At decision block 186, a determination is made as to whether the user wishes to operate the HVAC controller in accordance with the location-based procedure. If so, control passes to block 188 and the user is allowed to make setting selections in accordance with the location-based procedure. In some cases, this may include setting one or more of a home temperature, an away temperature and a geo-fence radius.

If the user does not wish to operate the HVAC controller in accordance with the location-based procedure, control passes to block 190, where the illustrative method 180 continues with querying the user to determine if the user wishes to operate the HVAC controller in accordance with a time-based procedure. If so, control passes to block 192 where the user is allowed to make setting selections in accordance with the time-based procedure. In some cases, this may include setting one or more of a time and a temperature for each of two or more time periods. In some cases, if the determination at decision block 194 is no, control may revert back to block 182.

Figure 11A:
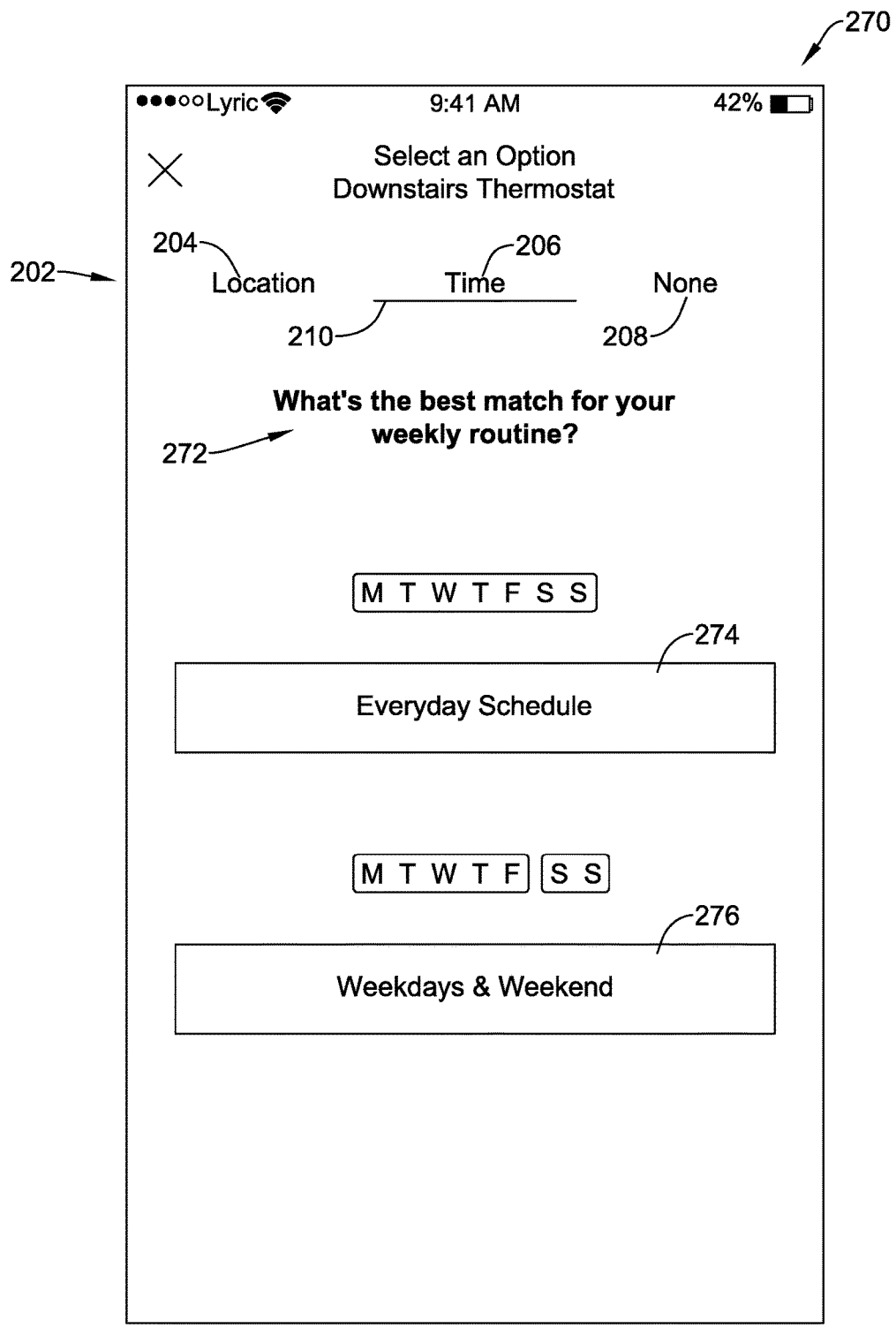
FIGS. 11A through 11C provide illustrative but non-limiting examples of screens that may be displayed pertaining to using a programmable schedule in setting up an HVAC controller.
Figure 11B:
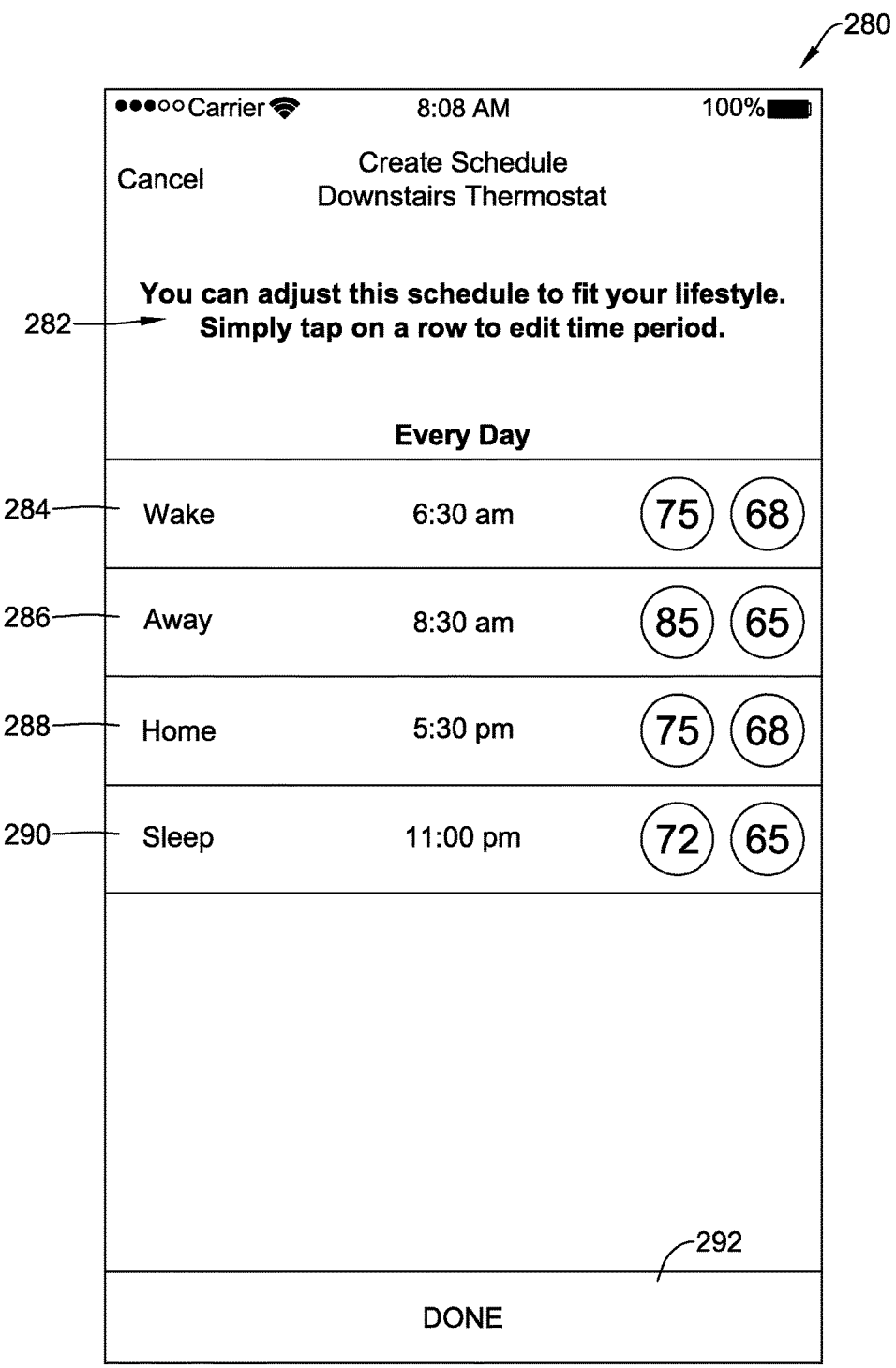
Figure 11C:
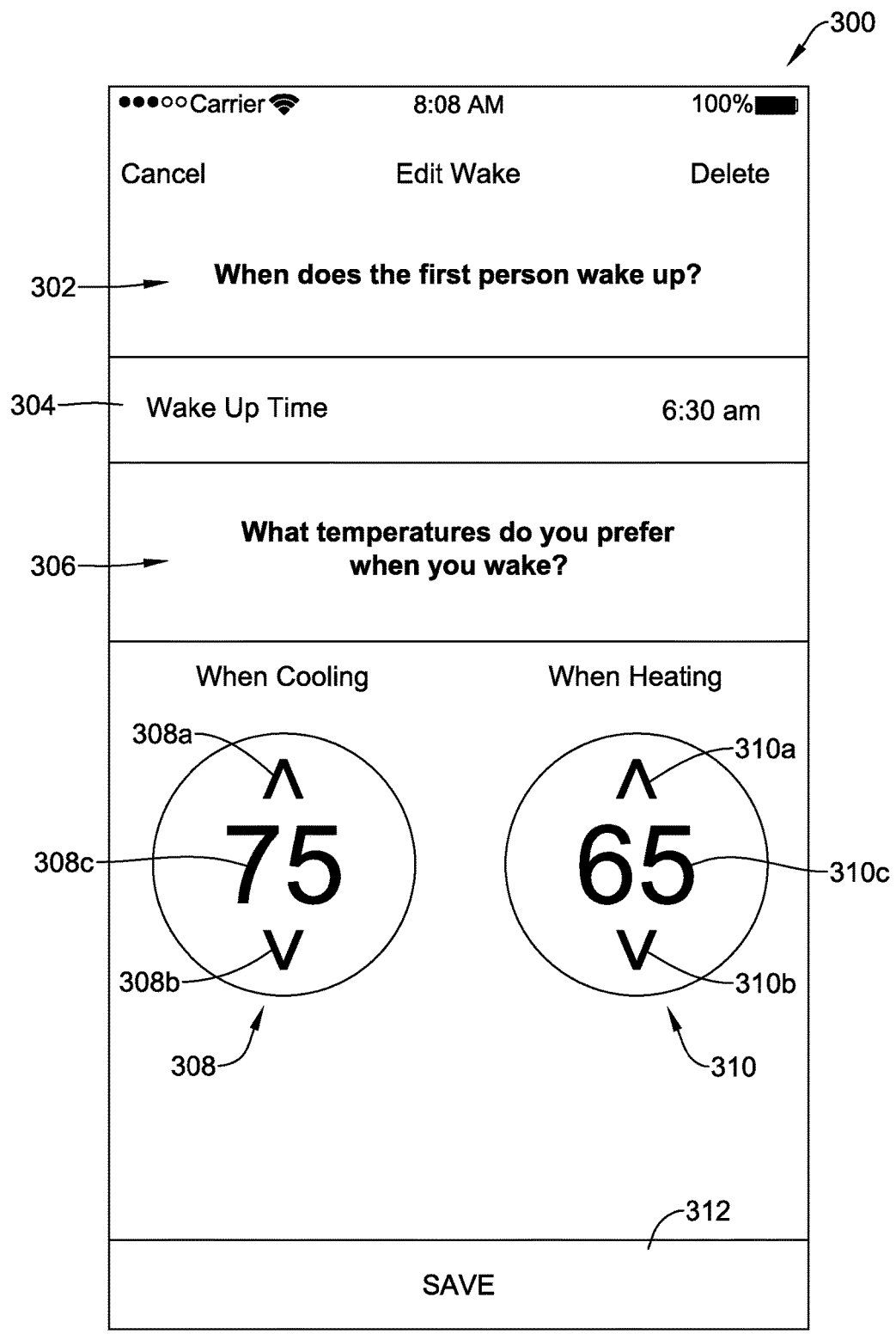
Figure 12A:
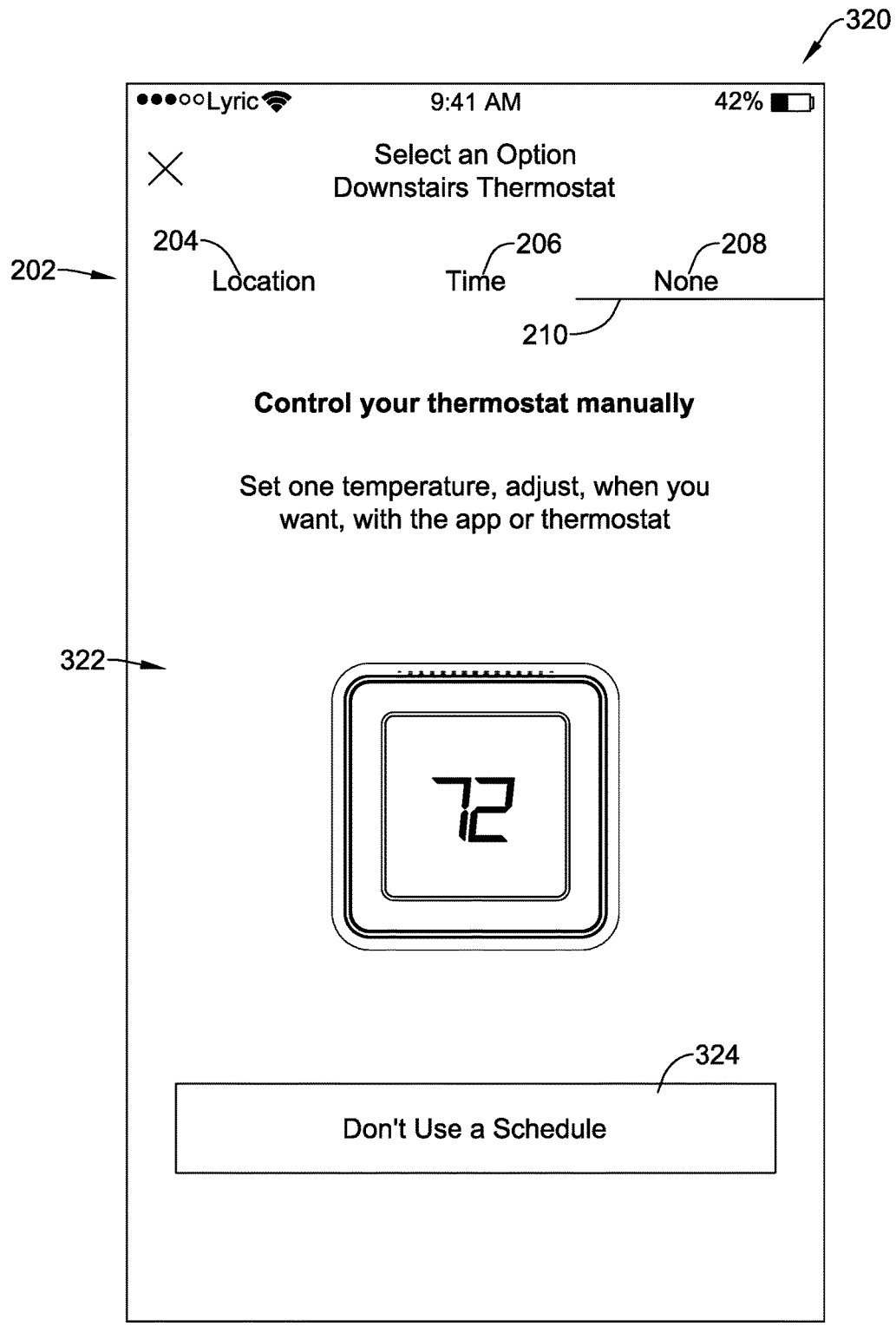
FIGS. 12A and 12B provide illustrative but non-limiting examples of screens that may be displayed pertaining to operating an HVAC controller in a manual mode.
Figure 12B:
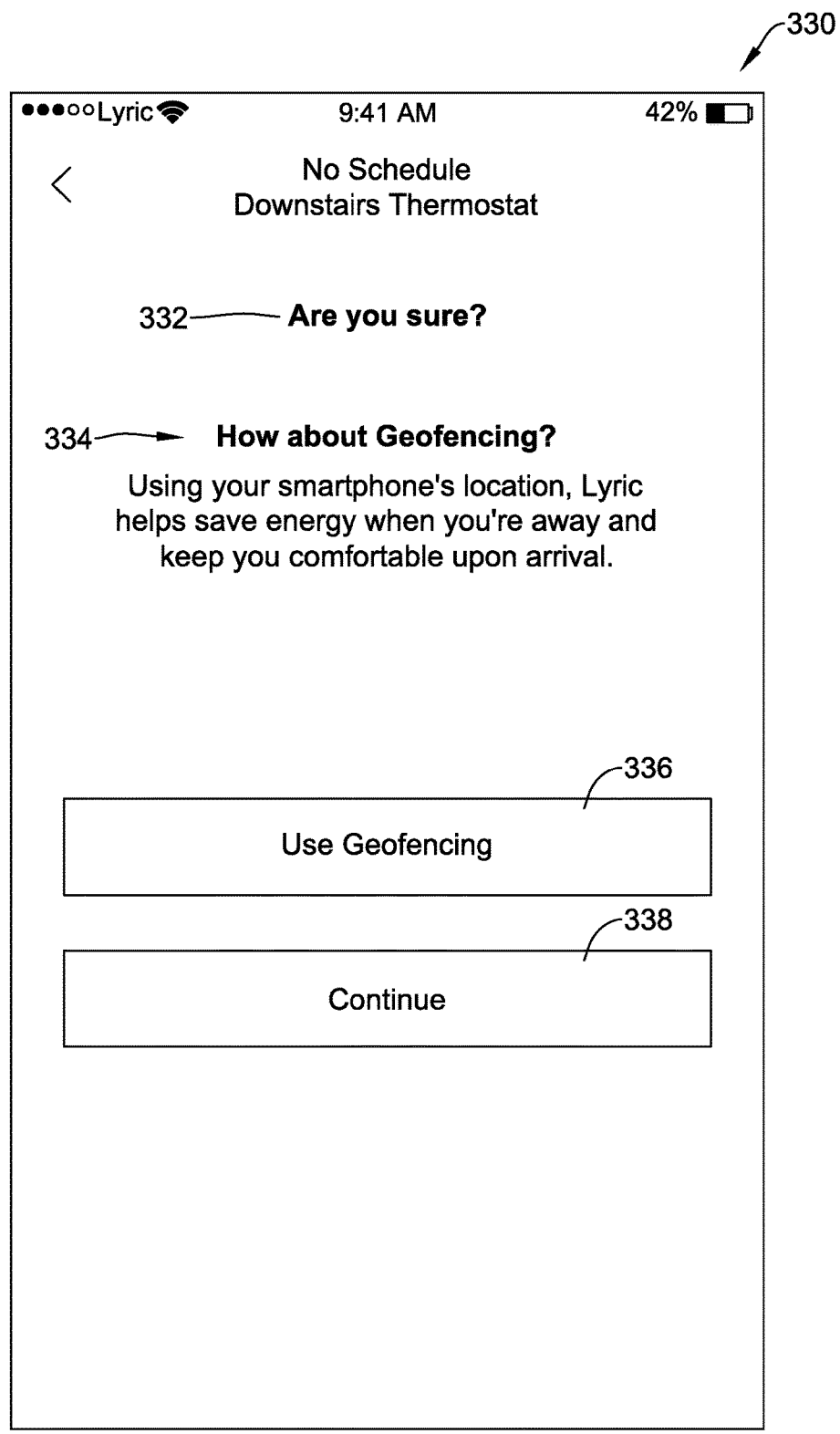

Reverting briefly to FIG. 7, which schematically shows examples of screens that may be displayed in helping a user to configure an HVAC controller. FIGS. 10A-10E provide illustrative but non-limiting examples of screens that may be displayed on the mobile device 120 (FIG. 6) and/or on a screen of the HVAC controller 98 (or 100) pertaining to a location-based scheduling procedure (geofencing). FIGS. 11A-11C provide illustrative but non-limiting examples of screens that may be displayed on the mobile device 120 and/or on a screen of the HVAC controller 98 (or 100) pertaining to a time-based scheduling procedure (programmable schedule). FIGS. 12A and 12B provide illustrative but non-limiting examples of screens that may be displayed on the mobile device 120 and/or on a screen of the HVAC controller 98 (or 100) pertaining to not using a schedule. In some cases, it will be appreciated that FIGS. 12A and 12B represent an optional route to operating an HVAC controller.

Figure 10A:
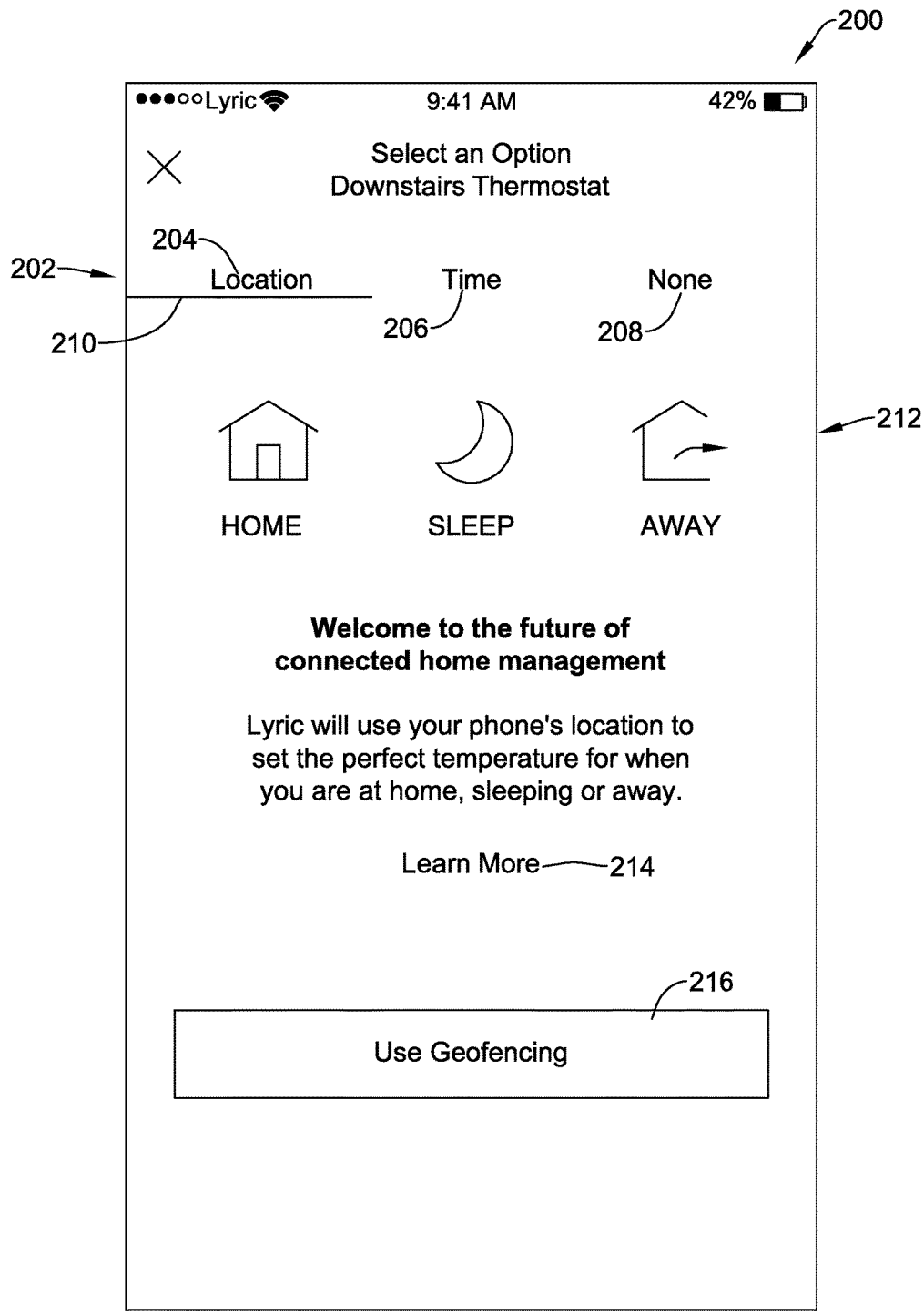
FIGS. 10A through 10E provide illustrative but non-limiting examples of screens that may be displayed pertaining to using geofencing in setting up an HVAC controller.

FIG. 10A shows a screen 200 that may be displayed when a user is configuring their HVAC controller. In some cases, the screen 200 may be an example of the first screen 132 of FIG. 7. The illustrative screen 200 includes a navigation bar 202 that includes, as shown, a Location tab 204, a Time tab 206 and a None tab 208. As can be seen, the Location tab 204 has been selected, as indicated by an indicator bar 210 disposed adjacent the Location tab 204. In some cases, the indicator bar 210 may instead be manifested by bolding the Location tab 204, or having the Location tab 204 flash, or blink, or appear in a different color. As can be seen, the screen 200 includes an information section 212 that informs the user of some features and functions of location-based scheduling, or geofencing. A LEARN MORE button 214, if selected, may enable the user to learn more about geofencing. A USE GEOFENCING button 216, if selected, selects geofencing as the desired scheduling option, and proceeds to one or more additional screens that enable the user to make geofencing-related settings.

Figure 10B:
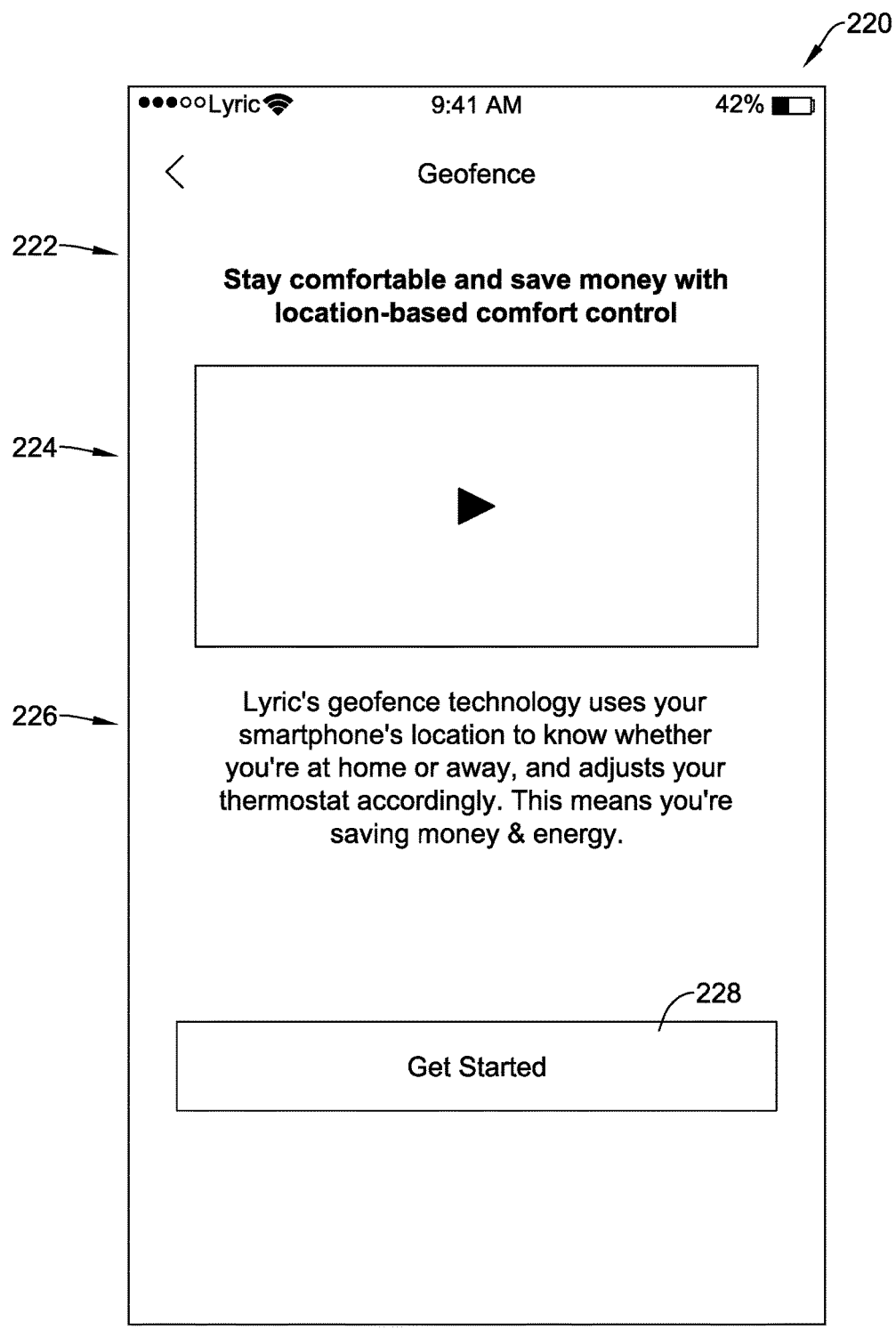

FIG. 10B shows a screen 220 that may be displayed as a result of selecting the LEARN MORE button 214 on screen 200. In some cases, the screen 220 may include one or more text portions 222 and 226 that provide the user with alphanumeric information pertaining to geofencing. In some cases, as illustrated, the screen 220 may include a video clip icon 224 that may be selected to learn more about geofencing. A GET STARTED button 228, if selected, may permit the user to start setting up geofencing. In some cases, selecting the GET STARTED button 228, as shown on the screen 220, may have the same result as selecting the USE GEOFENCING button 216 on screen 200 of FIG. 10A.

Figure 10C:
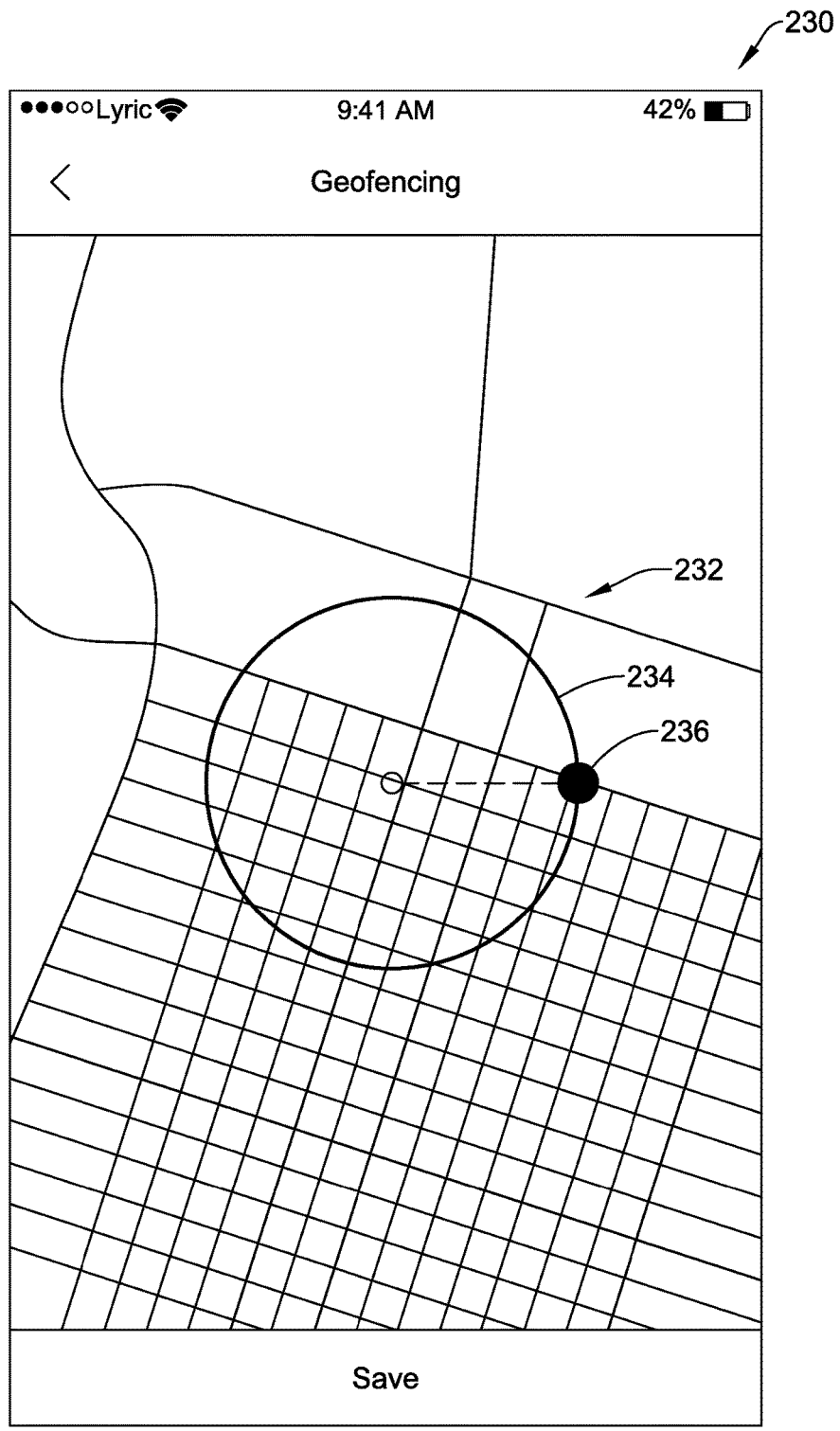

FIG. 10C shows a screen 230 that may be displayed if the user has not already set their geofence radius. The screen 230 includes a map 232 that displays the area around the user's home, generally with the home centered on the map 232. A geofence boundary 234 may be superimposed on the map 232. A button 236 may be dragged in order to increase or decrease a radius of the geofence boundary 234. While the geofence boundary 234 is illustrated as a circle, easily changeable in radius by dragging the button 236, it will be appreciated that in some cases the geofence boundary 234 may instead take any of a variety of different shapes. For example, if the home is next to the ocean, or a large lake, a portion of the geofence boundary 234 may follow the outline of the body of water. In some cases, the shape of the geofence boundary 234 may correspond to a city boundary, a county boundary or have any other suitable shape, as desired.

Figure 10D:
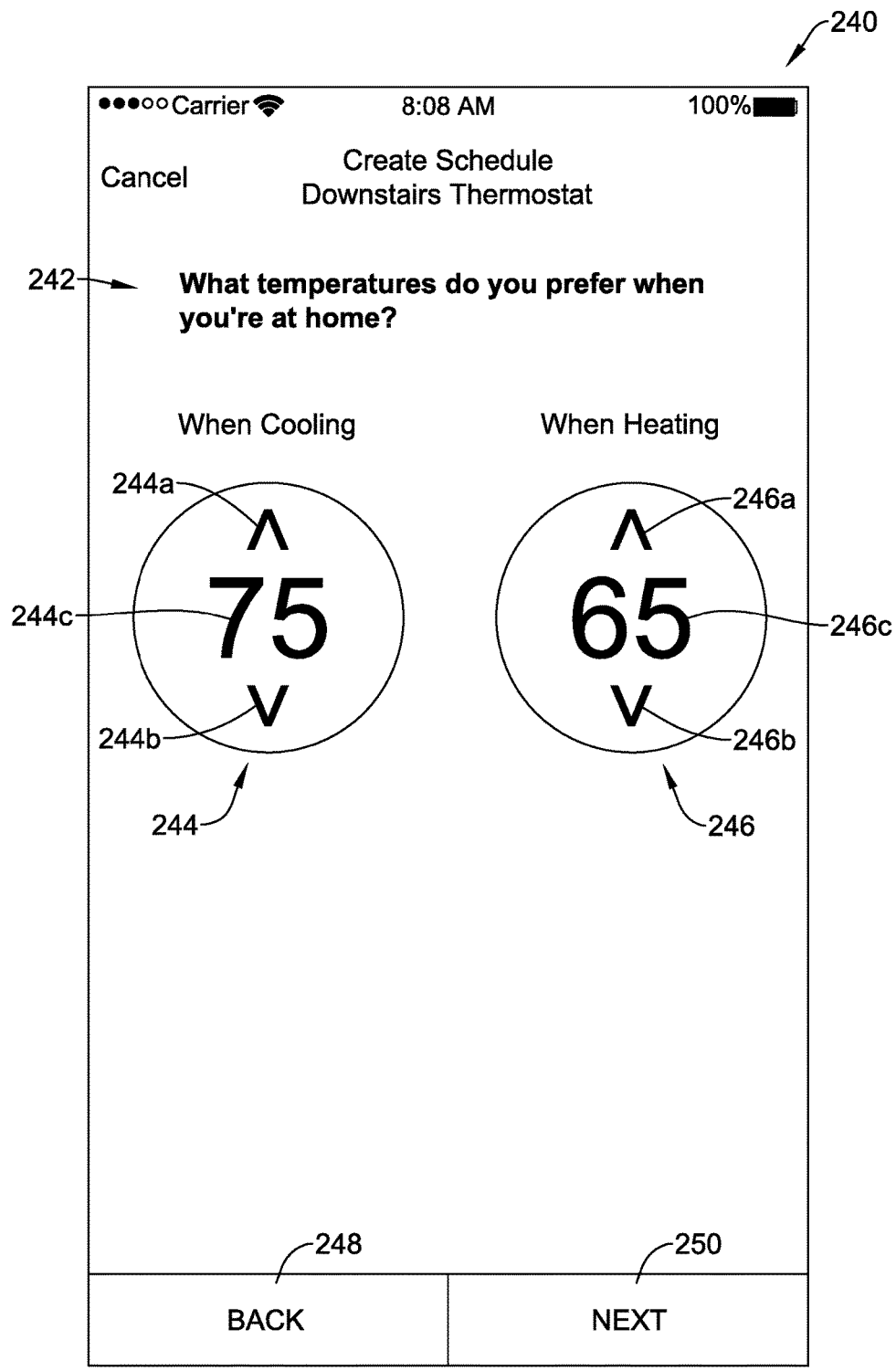
Figure 10E:
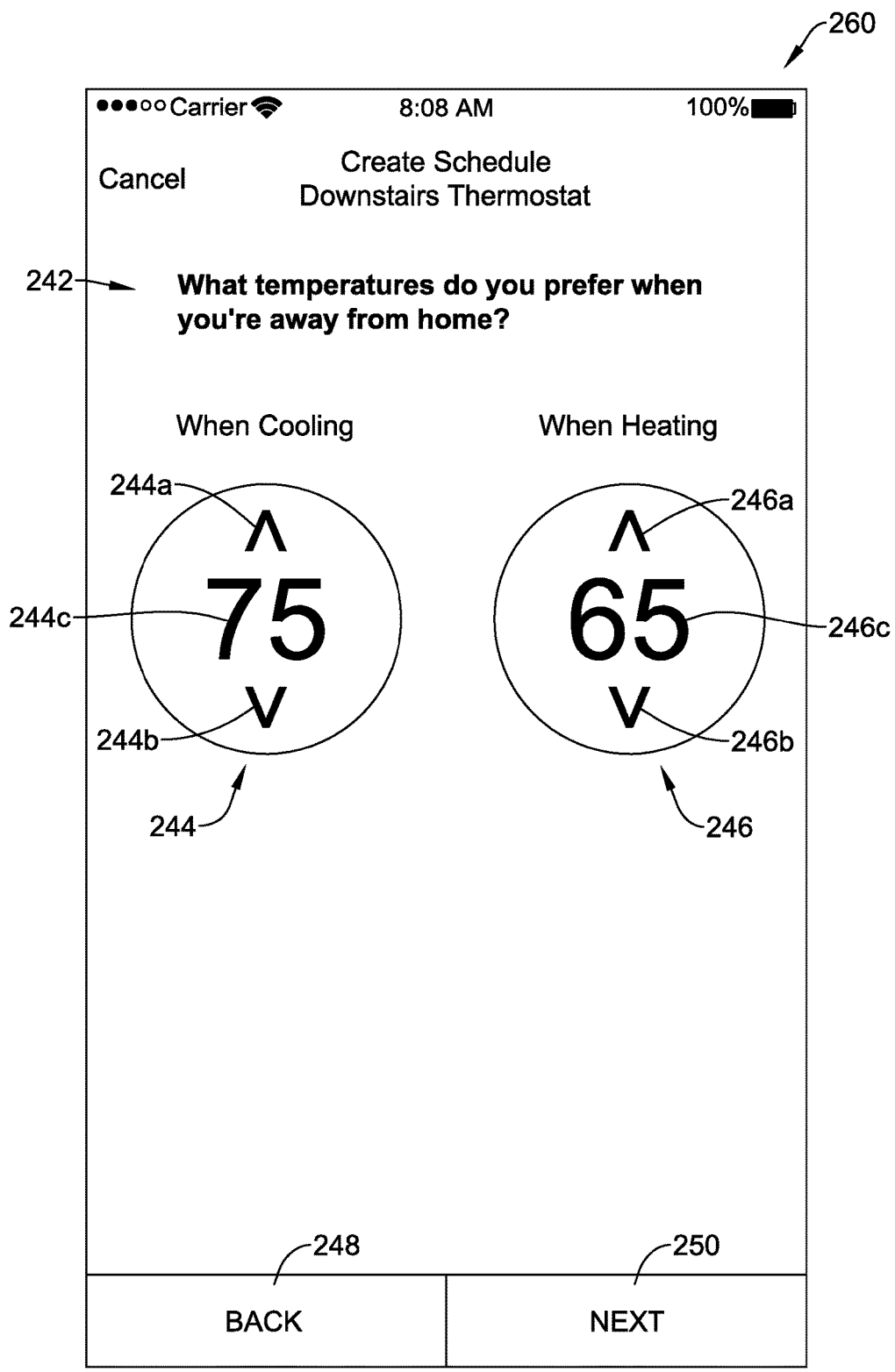

FIG. 10D shows a screen 240 that enables a user to set HOME temperature settings for geofencing, as indicated by a query 242. An icon 244 includes an up arrow 244a and a down arrow 244b that may be used as desired to increase or decrease a cooling temperature 244c. An icon 246 includes an up arrow 246a and a down arrow 246b that may be used as desired to increase or decrease a heating temperature 246c. A BACK button 248 and a NEXT button 250 may be used to navigate linearly between screens. In this example show, selecting the NEXT button 250 causes a screen 260 of FIG. 10E to be displayed. The screen 260 enables the user to select heating and cooling temperatures for an AWAY period, as indicated by the query 242. The screens shown in FIGS. 10C-10E may be examples of the one or more screens 150A, 150B, 150C of FIG. 7.

When geofencing determines that the home is occupied, the HVAC controller 98 (or 100) may operate in accordance with the HOME temperature settings. When geofencing determines that the home is unoccupied, the HVAC controller 98 (or 100) may operate in accordance with the AWAY temperature settings.

FIGS. 11A through 11C provide illustrative but non-limiting examples of screens that may be displayed pertaining to using a programmable schedule in setting up an HVAC controller. Screen 270 of FIG. 11A includes the navigation bar 202 that has the Location tab 204, the Time tab 206 and the None tab 208, as also shown in FIG. 10A. The screen 200 shown in FIG. 10A and the screen 270 shown in FIG. 11A may be examples of the first screen 132 and the second screen 134 of the series of screens of FIG. 7.

In FIG. 10A, the Location tab 204 has been selected. In FIG. 11A, the Time tab 206 has been selected, as indicated by the indicator bar 210 disposed adjacent the Time tab 206. In some cases, the indicator bar 210 may instead be manifested by bolding the Time tab 206, or having the Time tab 206 flash, or blink, or appear in a different color.

A query 272 on screen 200 asks the user to indicate how their schedule changes from day to day. A button 274 may be selected if the user has the same schedule for each day of the week. A button 276 may be selected if the user has one schedule for weekdays and another schedule for weekends. In the example shown, selecting the button 274 causes display of a screen 280, as shown in FIG. 11B. It will be appreciated that a similar screen, with information for differing days of the week, may be displayed as a result of selecting the button 276.

As shown in FIG. 11B, the screen 280 may include information 282 that tells the user how to proceed. The screen 280 includes a WAKE row 284, an AWAY row 286, a HOME row 288 and a SLEEP row 290. Each row includes a starting time, a heating temperature and a cooling temperature for that time period. A DONE button 292 allows the user to revert to a previous screen. FIG. 11C shows a screen 300 that may be displayed as a result of the user tapping, for example, the WAKE row 284.

In FIG. 11C, the screen 300 includes a query 302 asking the user to indicate what time the first person wakes up in the home. The wake up time is displayed in a row 304. The wake up time may be edited, for example, by selecting the row 304. A query 306 asks the user to indicate a preferred temperature for when they wake up. An icon 308 includes an up arrow 308a and a down arrow 308b that may be used as desired to increase or decrease a cooling temperature 308c. An icon 310 includes an up arrow 310a and a down arrow 310b that may be used as desired to increase or decrease a heating temperature 310c. A SAVE button 312 enables the user to save any changes they made. The screens shown in FIGS. 11B-11C may be examples of the one or more screens 152A, 152B, 152C of FIG. 7.

FIGS. 12A and 12B provide illustrative but non-limiting examples of screens that may be displayed pertaining to operating an HVAC controller in a manual mode. Screen 320 of FIG. 12A includes the navigation bar 202 that has the Location tab 204, the Time tab 206 and the None tab 208, as also shown in FIGS. 10A and 11A. The screen 200 shown in FIG. 10A, the screen 270 shown in FIG. 11A, and the screen 320 of FIG. 12A, may be examples of the first screen 132, the second screen 134 and the third screen 136 of the series of screens of FIG. 7. In FIG. 12A, the None tab 208 has been selected, as indicated by the indicator bar 210 disposed adjacent the None tab 208. In some cases, the indicator bar 210 may instead be manifested by bolding the None tab 208, or having the None tab 208 flash, or blink, or appear in a different color. An information section 322 informs the user that they have the option to control their thermostat manually. It will be appreciated that in some cases, the use may not have the option to do so, at least not during initial configuration. A button 324 enables the user to select manual operation. In the example shown, selection of the button 324 may cause display of a screen 330, as shown in FIG. 12B.

In FIG. 12B, the screen 330 includes a query 332, asking the user to confirm that they want manual operation. A query 334 asks them to once again consider geofencing. The screen 330 includes a button 336 that enables the user to change their mind and select geofencing. Selecting the button 336 may, for example, cause display of a screen such as the screen 200 shown in FIG. 11A. A continue button 338, if selected, may confirm the user's desire for manual operation. The in FIG. 12B may be an example of the one or more screens 154A, 154B, 154C of FIG. 7.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A non-transitory, computer-readable medium containing program instructions for facilitating a user in setting up schedule settings of an HVAC controller, wherein execution of the program instructions by one or more processors carries out the steps of:
    displaying in a sequence of preference of user selection a first scheduling setup procedure option pertaining to using geofencing in operation of the HVAC controller and a second scheduling setup procedure option pertaining to using a programmable schedule in operation of the HVAC controller, the first scheduling setup procedure option being selectable for use before the second scheduling setup procedure option is made available for selection to a user;
    when the user selects the first scheduling setup procedure option, displaying one or more screens on the user interface that allow the user to make setting selections in accordance with the first scheduling setup procedure option;
    when the user does not select the first scheduling setup procedure option, and instead advances to the second scheduling setup procedure option, displaying one or more screens on the user interface that allow the user to make setting selections in accordance with the second scheduling setup procedure option.

2. The non-transitory, computer-readable medium of claim 1, wherein the user selects the first scheduling setup procedure option by selecting an acceptance element of the first scheduling setup procedure option, and the user advances to the second scheduling setup procedure option by selecting navigation element of the first scheduling setup procedure option.

3. The non-transitory, computer-readable medium of claim 1, wherein when the user does not select the second scheduling setup procedure option, advancing to a third schedule option.

4. The non-transitory, computer-readable medium of claim 3, wherein the second scheduling setup procedure option is selectable for use by the user before the third schedule option is made available to the user.

5. The non-transitory, computer-readable medium of claim 3, wherein the third schedule option pertains to utilizing geofencing plus a schedule in operation of the HVAC controller.

6. The non-transitory, computer-readable medium of claim 5, wherein one or more the setting selections in accordance with the third schedule option comprise one or more of a home temperature, an away temperature, a geo-fence radius, a wake time, a wake temperature, a sleep time and a sleep temperature.

7. The non-transitory, computer-readable medium of claim 3, wherein the third schedule option comprises a non-schedule option.

8. The non-transitory, computer-readable medium of claim 1, wherein the setting selections in accordance with the first scheduling setup procedure option comprise one or more of a home temperature, an away temperature and a geo-fence radius.

9. The non-transitory, computer-readable medium of claim 1, wherein the setting selections in accordance with the second scheduling setup procedure option comprise one or more of a time and a temperature for each of two or more time periods.

10. The non-transitory, computer-readable medium of claim 1, wherein the navigation element of the first screen comprises a swipe element that can be used to move to the second screen with a swipe gesture.

11. The non-transitory, computer-readable medium of claim 1, wherein the program instructions are executed by one or more processors of a smartphone or one or more processors of the HVAC controller.

12. A wireless mobile device configured to facilitate setup of an HVAC controller, the wireless mobile device comprising:
    a user interface;
    a wireless communications port;
    a controller coupled with the user interface and the wireless communications port;
    the controller configured to display in a sequence of preference of user selection a first scheduling setup procedure option pertaining to utilizing geofencing in operation of the HVAC controller and a second scheduling setup procedure option pertaining to utilizing a programmable schedule in operation of the HVAC controller in the absence of geofencing, the first scheduling setup procedure option being selectable for use before the second scheduling setup procedure option is made available for selection to a user;
    when the user selects the first scheduling setup procedure option, the controller is configured to display one or more screens on the user interface that allow the user to make setting selections in accordance with the first scheduling setup procedure option;
    when the user does not select the first scheduling setup procedure option, and instead advances to the second scheduling setup procedure option,
    the controller is configured to display one or more screens on the user interface that allow the user to make setting selections in accordance with the second scheduling setup procedure option.

13. The wireless mobile device of claim 12, wherein the controller is configured to communicate the setting selections via the wireless communications port of the wireless mobile device.

14. The wireless mobile device of claim 13, wherein the setting selections are communicated to a remote server.

15. A method of guiding a user in setting up a HVAC controller, the method comprising:
    in sequence, querying the user in a first query to determine if the user wishes to operate the HVAC controller in accordance with a location-based procedure before querying the user in a second query to determine if the user wishes to operate the HVAC controller in accordance with a time-based procedure;
    accepting a first indication from the user in response to the first query, and if the first indication indicates that the user wishes to operate the HVAC controller in accordance with the location-based procedure, then allowing the user to make setting selections in accordance with the location-based procedure and skipping the second query;

if the first indication indicates that the user does not wish to operate the HVAC controller in accordance with the location-based procedure, querying the user via the second query to determine if the user wishes to operate the HVAC controller in accordance with the time-based procedure; and accepting a second indication from the user in response to the second query, and if the second indication indicates that the user wishes to operate their HVAC controller in accordance with the time-based procedure, then allowing the user to make setting selections in accordance with the time-based procedure.

16. The method of claim 15, wherein:

the setting selections in accordance with the location-based procedure comprise one or more of a home temperature, an away temperature and a geo-fence radius; and the setting selections in accordance with the time-based procedure comprise one or more of a time and a temperature for each of two or more time periods.

* * * * *